United States Patent

Artz et al.

[15] 3,641,505

[45] Feb. 8, 1972

[54] MULTIPROCESSOR COMPUTER ADAPTED FOR PARTITIONING INTO A PLURALITY OF INDEPENDENTLY OPERATING SYSTEMS

[72] Inventors: Walter M. Artz, Succasunna; Kenneth R. Cornelius, Parsippany; John W. Olson, Morris Township, Morris County, all of N.J.; Gary R. Signor, Burlington, N.C.; Francis E. Slojkowski, Millburn, N.J.

[73] Assignees: Bell Telephone Laboratories, Incorporated, Murray Hill, N.J. by said Artz, said Cornelius, said Olson and said Slojkowski; Western Electric Company, Incorporated, New York, N.Y. , by said Signor

[22] Filed: June 25, 1969

[21] Appl. No.: 836,242

[52] U.S. Cl. ........ 340/172.5

[51] Int. Cl. ........ G06f 9/00, G06f 15/00

[58] Field of Search ........ 340/172.5

[56] References Cited

UNITED STATES PATENTS

| | | | |
|---|---|---|---|
| 3,174,135 | 3/1965 | Dreyer et al. | 340/172.5 |
| 3,286,240 | 11/1966 | Thompson et al. | 340/172.5 |
| 3,411,139 | 11/1968 | Lynch et al. | 340/172.5 |
| 3,419,849 | 12/1968 | Anderson et al | 340/172.5 |

*Primary Examiner*—Paul J. Henon
*Assistant Examiner*—R. F. Chapuran
*Attorney*—R. J. Guenther and William L. Keefauver

[57] ABSTRACT

A multiprocessor computing system is disclosed in which a number of processing units, program storage units, variable storage units and input-output units may be selectively combined to form one or more independent data processing systems. System partitioning into more than one independent system is controlled alternatively by manual switching or program-directed partitioning signals. Isolation of single units and segmentation of a plurality of units less than a full operating system are also controlled by the same lockout system.

13 Claims, 34 Drawing Figures

INVENTORS:
W. M. ARTZ J. W. OLSON
K. R. CORNELIUS G. R. SIGNOR
F. E. SLOJKOWSKI
BY R. O. Nimtz
ATTORNEY

CENTRAL LOGIC AND CONTROL CABLING

CENTRAL LOGIC AND CONTROL (FUNCTIONAL)

STORE ACCESS

PROGRAM CONTROL UNIT

ARITHMETIC CONTROL UNIT

PATENTED FEB 8 1972 3,641,505

SHEET 09 OF 22

VARIABLE STORE INTERFACE SWITCHING UNIT

FIG. 10 INPUT/OUTPUT CONTROLLER AND RECORDING SUBSYSTEM

TIMING AND STATUS UNIT

TIMING GENERATOR

FIG. 14 STORE TRANSFER UNIT

CONFIGURATION DISPLAY

LOCKOUT LOGIC

LOCKOUT EXAMPLE

FIG. 19A
GATE
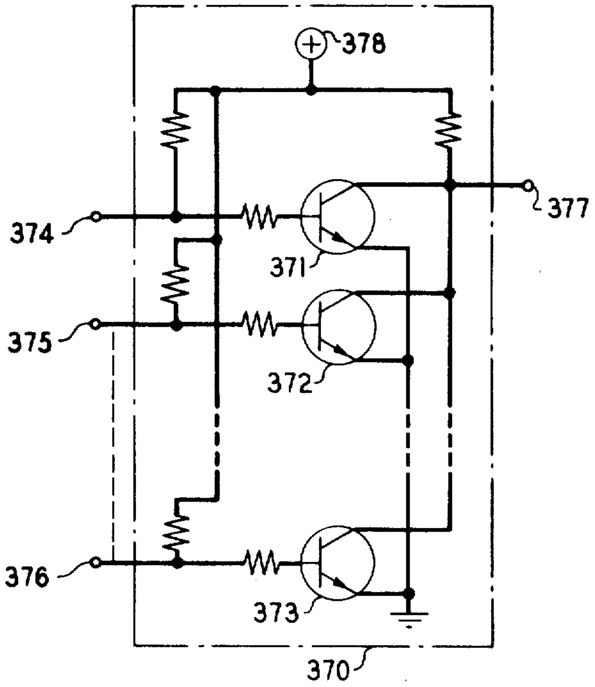
FIG. 19B
NOT-AND
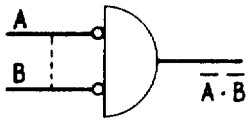
FIG. 19C
NOR
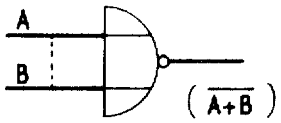
FIG. 19D
| A \ B | 0 | 1 |
|---|---|---|
| 0 | 1 | 0 |
| 1 | 0 | 0 |
FIG. 20A
FLIP-FLOP
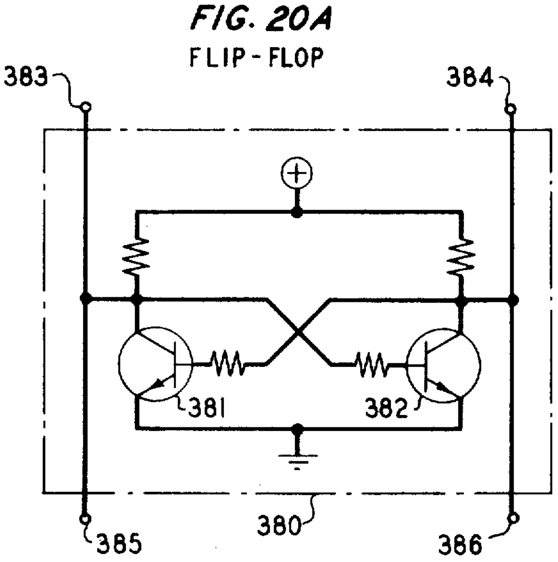
FIG. 20B
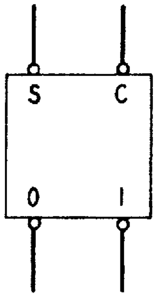

INVERTER

EMITTER FOLLOWER

CABLE DRIVER

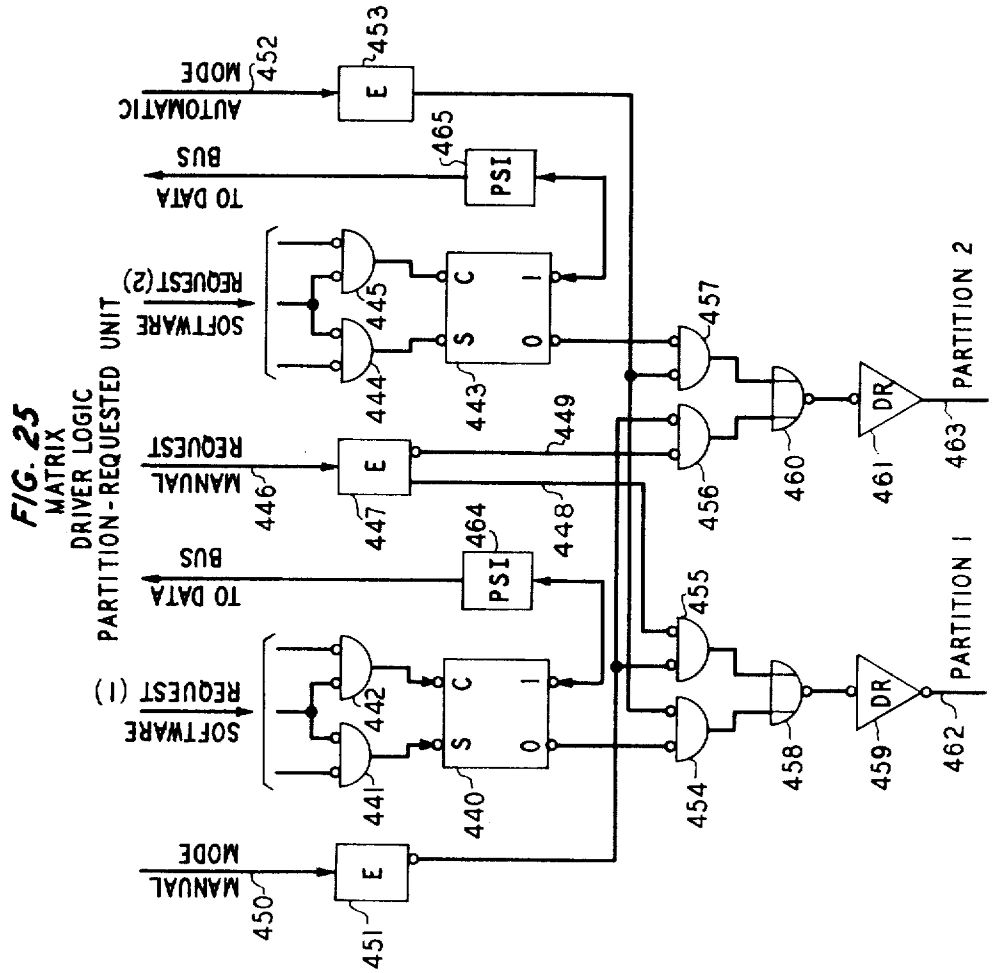
FIG. 25 MATRIX DRIVER LOGIC PARTITION-REQUESTED UNIT
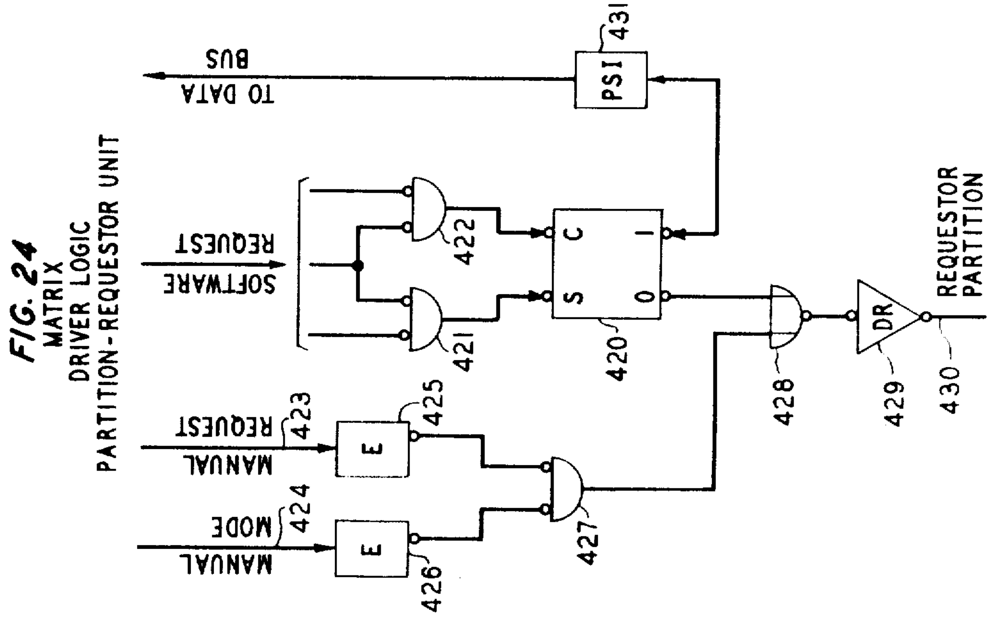
FIG. 24 MATRIX DRIVER LOGIC PARTITION-REQUESTOR UNIT FIG.27 MATRIX CROSSPOINT LOGIC
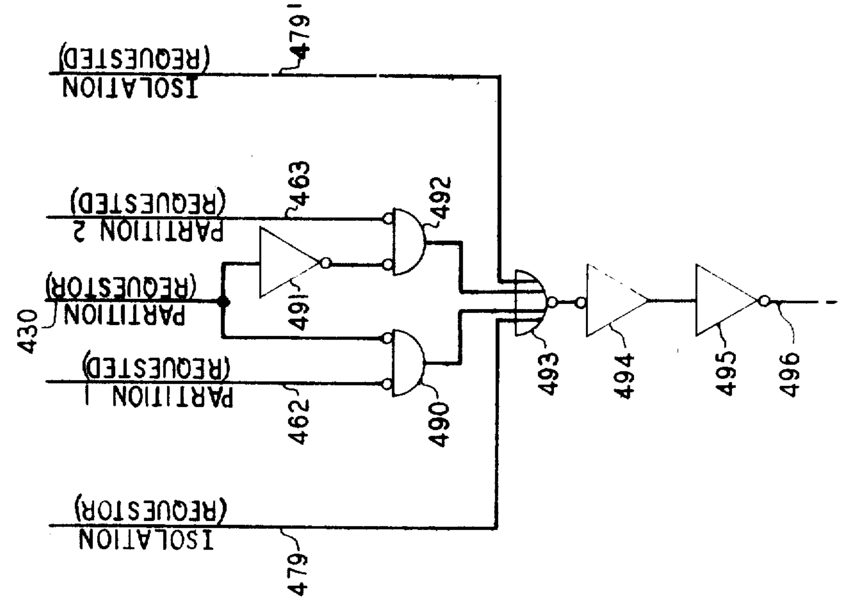
FIG.26 MATRIX DRIVER LOGIC-ISOLATION REQUESTOR AND REQUESTED UNIT
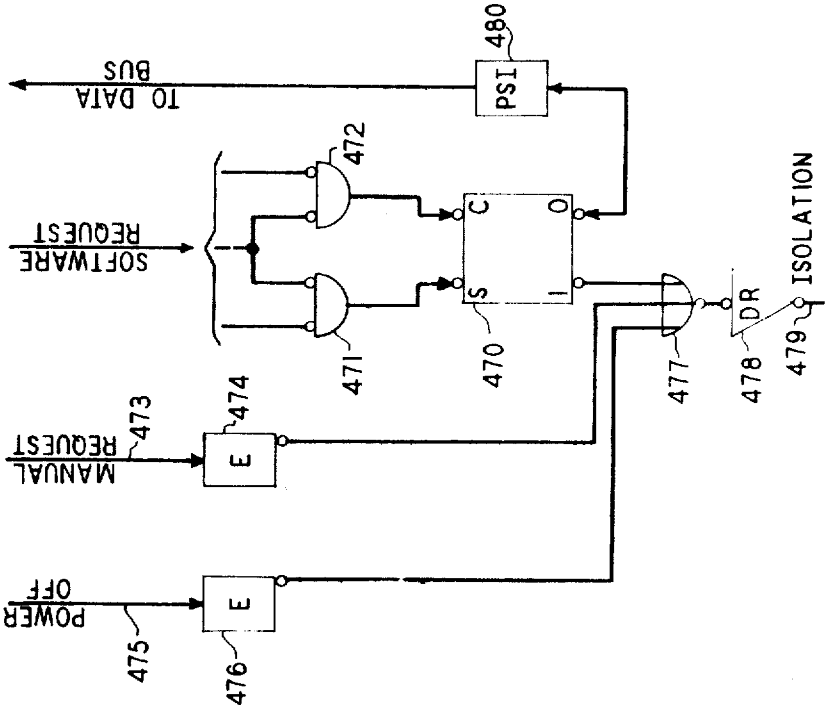

MULTIPROCESSOR COMPUTER ADAPTED FOR PARTITIONING INTO A PLURALITY OF INDEPENDENTLY OPERATING SYSTEMS

GOVERNMENT CONTRACT

The invention herein claimed was made in the course of, or under contract with the Department of the Army.

FIELD OF THE INVENTION

This invention relates to multiprocessor data processing systems and, more particularly, to data processing systems constructed of a plurality of identical modules capable of being interconnected into a variety of different configurations.

BACKGROUND OF THE INVENTION

It has become increasingly common to construct large data processing systems in a modular fashion, permitting growth merely by adding further modules. The basic functional modules for a data processing system include a central processing unit, a memory unit and an input-output unit. In the ideal situation, the number of each of these units can be varied to produce an optimum configuration for the data processing activity for which it is being used.

One major advantage of this arrangement is the ease with which standby units can be provided to be automatically switched into the system upon failure of an operating unit. The reliability of the system as a whole can be improved substantially in this way with a modest number of standby units.

Most data processing systems, however, are utilized for a wide variety of different data processing activities. Many of these activities have vastly different requirements in so far as numbers of units are concerned. Thus, real time control systems, for example, tend to require larger amounts of storage, processing capability and input/output facilities. Other important data processing activities, such as assembly and compilation, and most single-user applications programs, require considerably less processing capability.

It has been suggested to share the overall data processing system among these uses on a time-sharing basis in which each activity receives a proportionate share of the overall time available on the complete data processing system. This arrangement has the advantage of dividing the data processing facilities among all of the activities on a time basis, giving each activity sufficient time so that no undue delays are introduced into any activity. This arrangement, however, has the major disadvantage of requiring large amounts of executive, monitoring and bookkeeping time to keep all of the activities coordinated and separated. Indeed, it is entirely possible that increasing a time-sharing system beyond a certain point can lead to a net loss of computing capacity due to this high overhead in nonproductive time.

It is an object of the present invention to increase the efficiency of large multiprocessor data processing systems.

It is a more specific object of the invention to reduce the large overhead involved in scheduling large numbers of data processing activities in a large time-shared data processing system of the multiprocessor type.

It is another object of the invention to accommodate large numbers of different data processing activities in a large data processing system without the usual large increase in overhead time.

SUMMARY OF THE INVENTION

In accordance with the present invention, these and other objects are attained by partitioning a large multiprocessor data processing system into a plurality of smaller, but complete, data processing systems. Different types of data processing activities can then take place in the different partitions. Indeed, the partitions can be tailored to provide precisely the facilities required for each of the data processing jobs at hand.

This arrangement does away with the necessity for monitoring and controlling the larger system as a whole, thus substantially reducing, or even eliminating, the large overhead. Moreover, once partitioning capability is achieved, the partitions can be varied in size to accommodate the actual data processing activities taking place. As an example, the real time data processing can be separated from the nonreal time data processing, thereby substantially simplifying the interrupt hierarchy.

In further accord with the present invention, partitioning is implemented by a system of interface switching units, providing a switching interface between each of the connected units of the data processing system. Each switching unit is controlled by a lockout signal which inhibits all signal transfers between each pair of selected units. Such lockout signals may be generated, for example, in a logic matrix of *n* dimensions, where *n* is the total number of desired partitions. Each unit of the data processing system then is represented by a cross point in the logic matrix. Columns, rows and planes in the logic matrix can then be used to select the partition to which each unit belongs. The lockout matrix can be driven by signals generated by manual switches or, alternatively, by program-generated signals.

This interface switching unit lockout arrangement has the further advantage of providing isolation and segmenting as well as partitioning. In this connection, "isolation" means the separation of a single unit from the rest of the data processing system, i.e., all connections through its interface switching unit are locked out. The purpose of isolation is normally for maintenance.

"Segmenting" means the separation of a plurality of units from the data processing system, which plurality of elements is less than is required for an independently operating system. Segmenting is normally utilized for diagnostic testing of the segment. "Partitioning," of course, means the separation of the units into a plurality of independently operating data processing units.

These and other objects and features, the nature of the present invention and its various advantages, will be more readily understood from a consideration of the attached drawings and from the following description of the drawings.

BRIEF DESCRIPTION OF THE DRAWINGS

In the drawings:

FIGS. 19A, 19B, 19C and 19D are a detailed circuit diagram, NAND symbol, NOL symbol, and a truth table, respectively, for a basic logic gate useful in implementing the circuits of the remainder os the drawings;

FIGS. 20A and 20B are a circuit diagram and circuit symbol, respectively, of a flip-flop circuit useful in realizing the circuits of the remainder of the drawings;

FIG. 24 is a circuit diagram of the matrix driver logic of a partition-requestor unit shown in block form in FIG. 17;

FIG. 25 is a circuit diagram of the matrix driver logic of a partition-requested unit shown in block form in FIG. 17;

FIG. 26 is a circuit diagram of the matrix driver logic for an isolated requestor or requested unit shown in block form in FIG. 17;

FIG. 27 is a circuit diagram of the matrix cross-point logic shown in block form in FIG. 17.

DETAILED DESCRIPTION OF THE DRAWINGS

Figure 1:
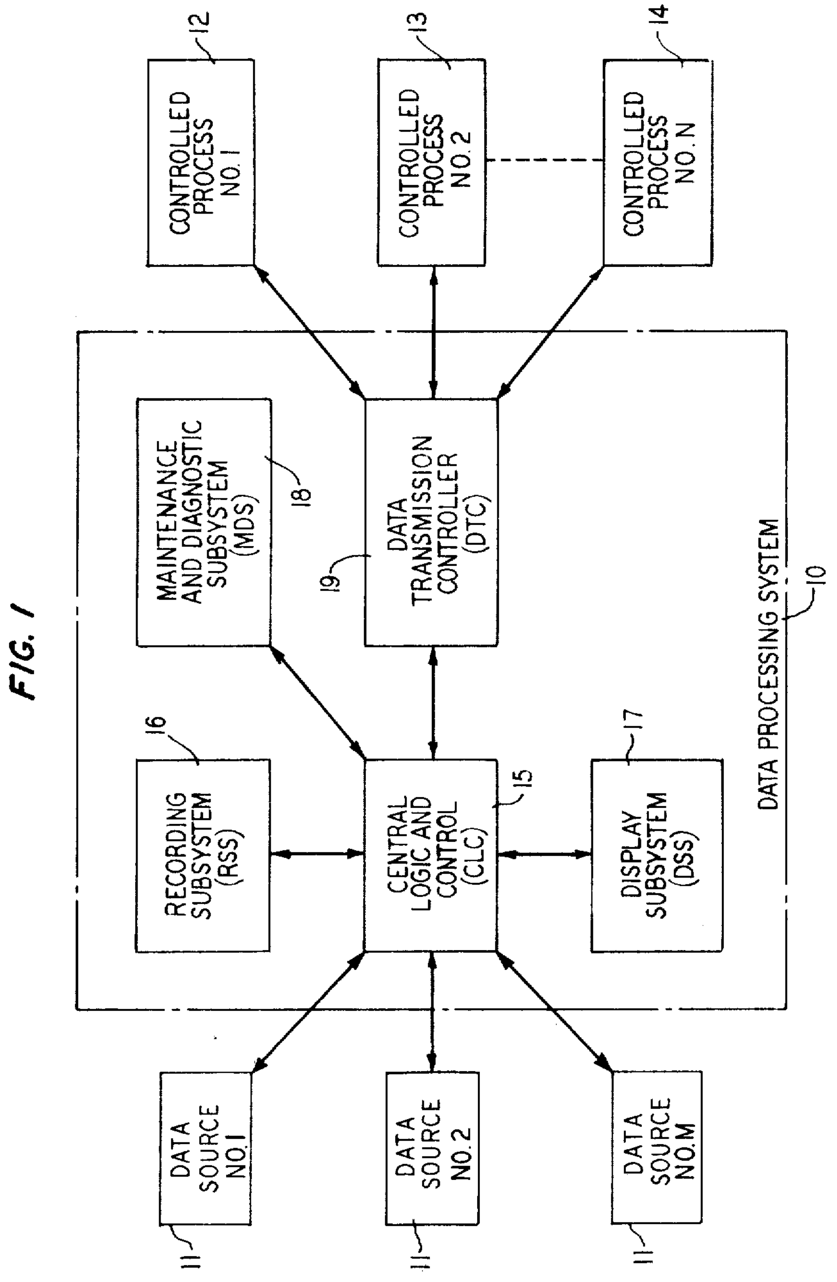
FIG. 1 is a general block diagram of a process control system utilizing a data processor and suitable for the use of the present invention.

Referring more particularly to FIG. 1, there is shown a general block diagram of a real-time data processing system 10 which accepts real-time data from data sources 11 and delivers real-time control signals to a plurality of controlled processes 12, 13 and 14. The data processing system 10 comprises a central logic and control 15 which includes the memory units, input-output control units and instruction execution units normally associated with a digital computing system. A recording subsystem 16 is associated with central logic and control 15 to provide permanent records of data derived from control 15 and to provide machine input into control 15. Subsystem 16 includes the punched card equipment, magnetic tapes and magnetic disk units normally associated with a data processing system. A display subsystem 17 is also associated with central logic and control 15 and includes a real-time display of certain of the operating characteristics of central logic and control 15.

A maintenance and diagnostic subsystem 18 is likewise associated with central logic and control 15 and includes all the circuits necessary to monitor the operation of control 15 to detect errors in that operation and to initiate the required automatic error correction or reorganization procedures. A data transmission controller 19 receives real-time data output from central logic and control 15 and utilizes this output to derive control signals for the control of processes 12, 13 and 14. Processes 12, 13 and 14 also include means for generating indication and verification signals for transmission back through transmission controller 19 to central logic and control 15 to indicate the progress and state of the operations being controlled.

The control system of FIG. 1 may be used for any real-time, computer-controlled operation such as, for example, an automatically controlled petroleum processing plant, an automated warehouse system, or even a fire control system for military applications. All such systems have in common the requirements of accepting input data in real time, performing detailed computations on this input data, and generating output control signals in real time. Many other applications of such a system will be readily apparent to those skilled in the art.

The central logic and control 15 of FIG. 1 is the central control element for the entire system. In situations where it is necessary to control large and complicated processes, it is necessary that substantial computing power be available in control 15. To this end, control 15 is organized on a modular basis. That is, each function required by central logic and control 15 is implemented by a plurality of identical units, the number of which may be varied to accommodate the specific data processing job required.

Figure 2:
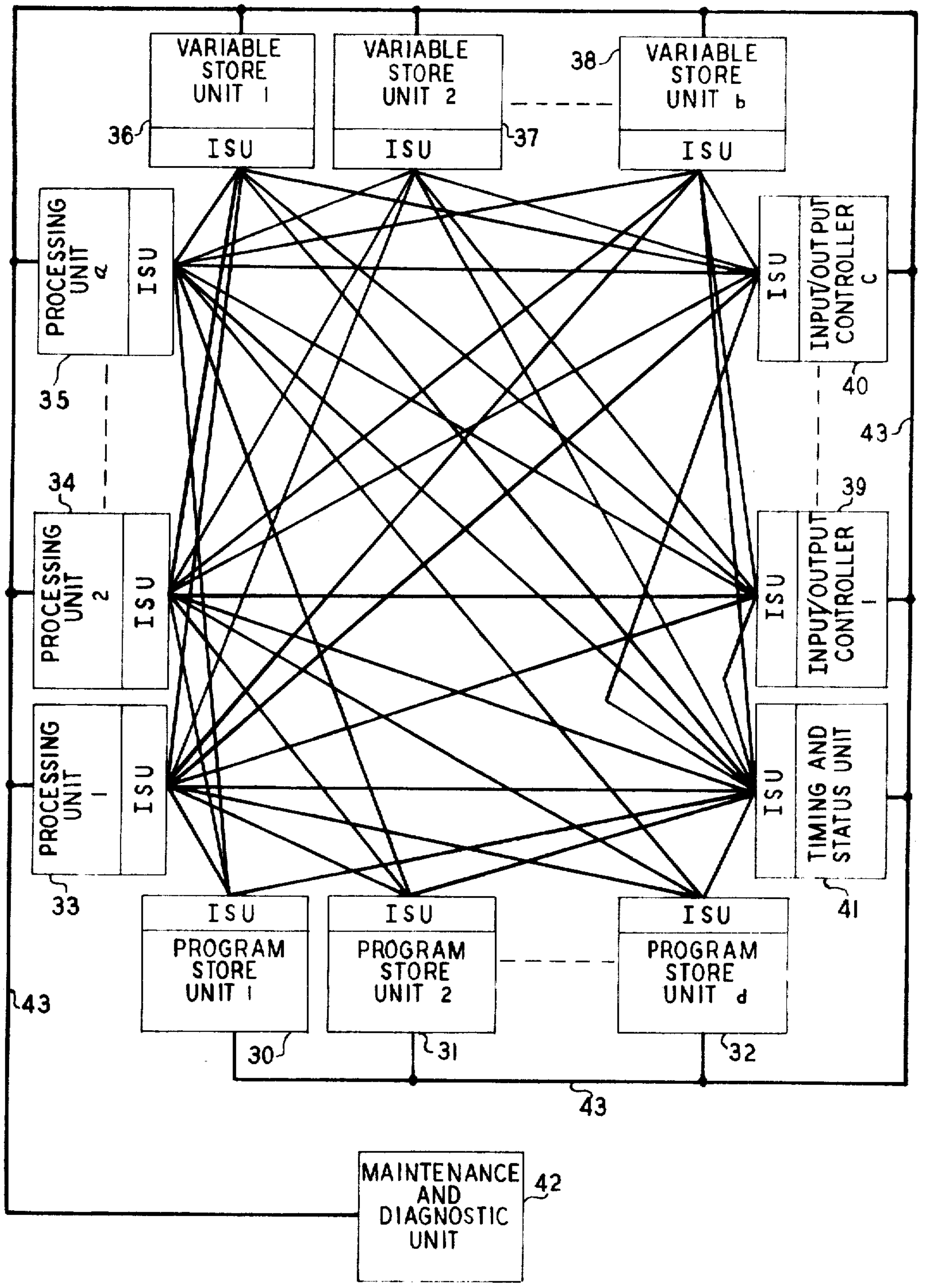
FIG. 2 is a block diagram of the interunit cabling required for the central logic and control shown in FIG. 1.

Turning then to FIG. 2, there is shown a schematic block diagram of a central logic and control suitable for use in the system such as that illustrated in FIG. 1. The basic modular units included in the central logic and control of FIG. 2 are a program store unit, a processing unit, a variable or operand store unit, an input-output controller and a timing and status unit. As can be seen in FIG. 2, a plurality of program store units 30, 31 and 32 are provided to store the sequence of machine instructions or commands necessary to operate the overall system.

A plurality of processing units 33, 34 and 35 are provided to execute the instructions when retrieved from the program store units 30 through 32. A plurality of variable store units 36, 37 and 38 are provided as temporary storage devices for data which is to serve as operands in the execution of instructions by the processing units 33 through 35. A plurality of input-output controllers 39, 40 are provided to control the transfer of data from the central logic and control of FIG. 2 to the remainder of the data processing system.

A timing and status unit 41 is provided to generate and distribute the basis timing required in the control of the system. In addition, unit 41 receives status reports in the form of binary data signals from all of the other units and records this information in appropriate registers for use in maintenance and diagnostic procedures.

In order to take full advantage of the modular arrangement of the central logic and control of FIG. 2, it is necessary that each of the units 30 through 41 be capable of interconnection with any one of the other units. This is accomplished by means of an interface switching unit (ISU) forming a portion of each of the units 30 through 41. The interface switching units terminate cables, illustrated in FIG. 2 by the solid lines, which are connected between the various units. The ISU's provide the selective gating necessary for the various connections and, also, provide a degree of priority control over the various interconnections.

A maintenance and diagnostic unit 42 is shown which serves to collect certain information from all of the other units of FIG. 2 by means of a multiplex data bus 43 and to use this information to diagnose and maintain the central logic and control. This maintenance and diagnostic unit 42 does not form a part of the central logic and control in a functional sense but is shown in FIG. 2 to illustrate the complete separation and independence of the data acquisition bus 43 from the normal data paths extending between the ISU's of the various units 30 through 41. It can thus be seen that the collection of maintenance and diagnostic information is not dependent upon the operability of all or any portion of the normal data processing paths. This considerably simplifies the monitoring function and increases reliability to a significant extent.

Figure 3:
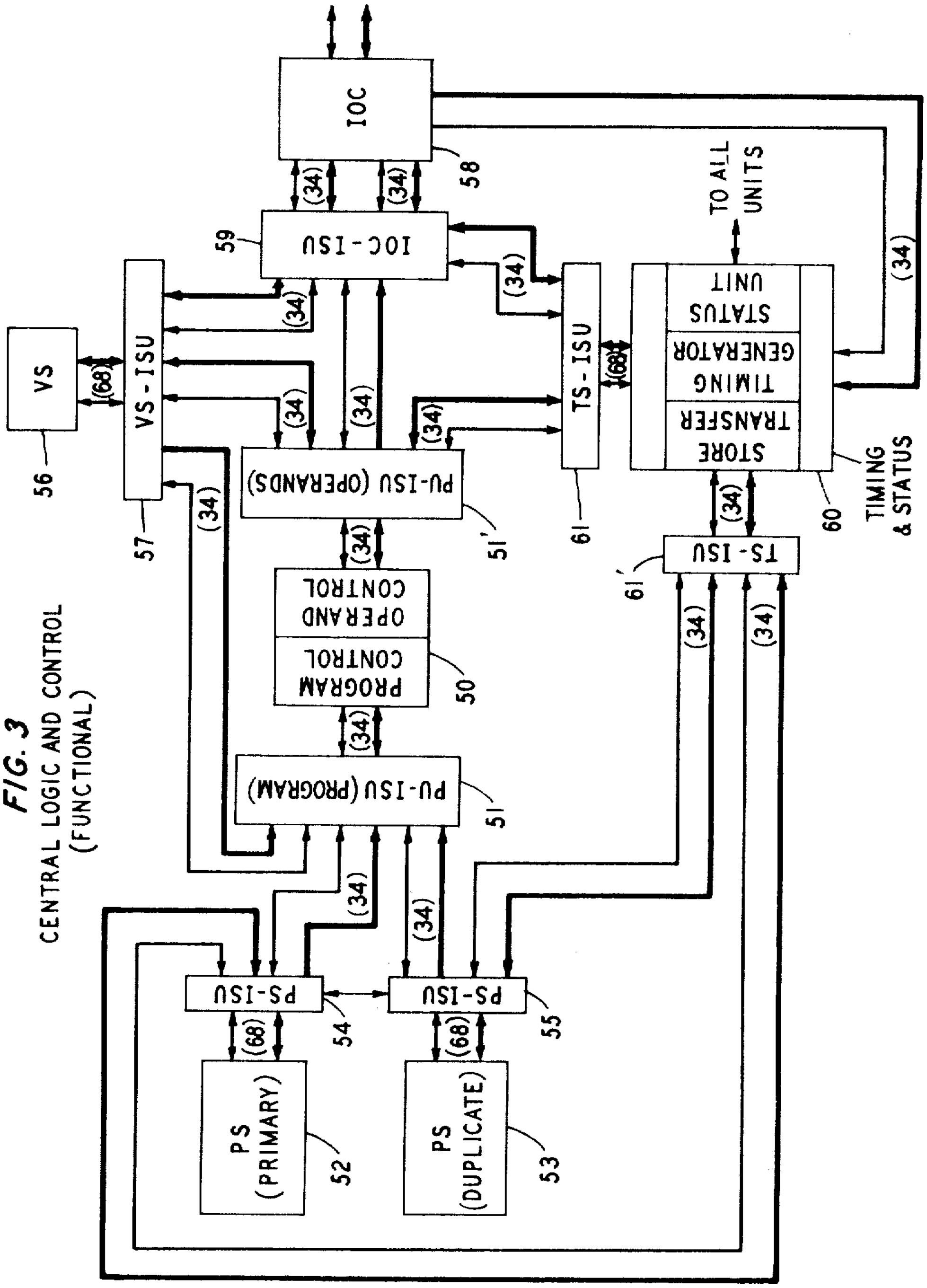
FIG. 3 is a block diagram of the functional interrelationships within the central logic and control of FIG. 1.

In order to better understand the operation of the central logic and control, a functional block diagram is shown in FIG. 3 showing the functional interrelationship of the various units of FIG. 2. Only a single one of each type of unit is shown in FIG. 3 for the purposes of simplicity, it being understood that similar interconnections exist between the multiple units as illustrated generally in FIG. 2.

In FIG. 3, data paths are illustrated by the heavy lines and control signal paths by the lighter lines. The number of binary positions or bits carried by each line is indicated by the numbers in parentheses adjacent the heavy lines. It can be seen that uniform cabling has been achieved by standardizing the cable size to 34 bits.

Referring then to FIG. 3, it can be seen that the central logic and control comprises processing unit 50 with its associated interface switching unit 51, shown in FIG. 3 as being divided into two portions. One portion communicates with the program control portion of processing unit 50, while the other communicates with the operand portion of processing unit 50. The program control portion of processing unit 50 receives program instructions from program store units 52 and 53 by way of interface switching units 54 and 55, respectively. For purposes of reliability, the same program instructions are registered in two different program store units. Thus, program store unit 52 is identified as the primary program store, while program store unit 53 is identified as the duplicate program store unit. Identical requests for the next instruction are issued to both store units 52 and 53 and the first program store unit to respond automatically cancels the request to the other unit. In this way, if program instructions in any one program store unit are lost through malfunctions, the system can continue to operate with essentially no loss of time.

The operand control portion of processing unit 50 retrieves data from the variable store unit 51′ and interface switching unit 57.

An input-output controller 58 is arranged to communicate with all of the other units by way of interface switching unit 59. That is, it may exchange data and commands with the operand control portion of processing unit 50 by way of interface switching units 51′ and 59. It may also exchange data and commands with variable store unit 56 by way of interface switching units 57 and 59. Finally, it may exchange data and commands with timing and status unit 60 by way of interface switching unit 61. The input-output controller 58, of course, controls transfers of information between the central logic and control of FIG. 3 and all of the other units of the data processing system shown in FIG. 1.

The timing and status unit 60 includes three independent subsystems necessary for the operation of the overall central logic and control. A store transfer subsystem controls the writing of program instructions into the program store units such as 52 and 53. Indeed, the store transfer subsystem is the only means for altering program instructions and communicates with the program store units by way of interface switching unit 61′, which is actually a portion of interface switching unit 61.

The timing generator subsystem and timing and status unit 60 provides all of the timing and clock information required for the operation of the system. Utilizing master clock signals, this timing generator subsystem maintains time-of-day information and issues timed commands for synchronizing various cycles of real-time data processing.

The status unit subsystem of timing and status unit 60 maintains a current record of the status of all units of the central logic and control, and periodically transfers this information into variable store units such as unit 56. The status unit also contains the control circuits for isolation segmentation and partitioning.

It can also be seen that the program control portion of processing unit 50 can obtain program instructions from variable store 56 by way of interface switching units 51 and 57. This permits temporary program sequences to be stored in variable store unit 56 and to be used to control processing unit 50. It will also be noted that all cables extending between the different units of the central logic and control of FIG. 3 include 34 bits of information, thus permitting uniform cable design.

As was previously noted, the central logic and control is the heart of the data processing system of FIG. 1. The central logic and control performs all of the data processing and computation required for the overall system. The central logic and control therefore includes many requestors which are capable of asynchronously requesting and receiving access to the various store units in the system. All possible pairs of these units are interconnected by direct switching paths to provide a high speed, flexible data processing capacity. The modular construction of the central logic and control permits its data processing capacity to be tailored to the needs of any particular application as well as providing high system reliability without excessive duplication. Only the program store has been duplicated in order to have full assurance that programs are available when required. Each storage unit is independent and a failure in any one unit does not disable the entire memory.

Figure 4:
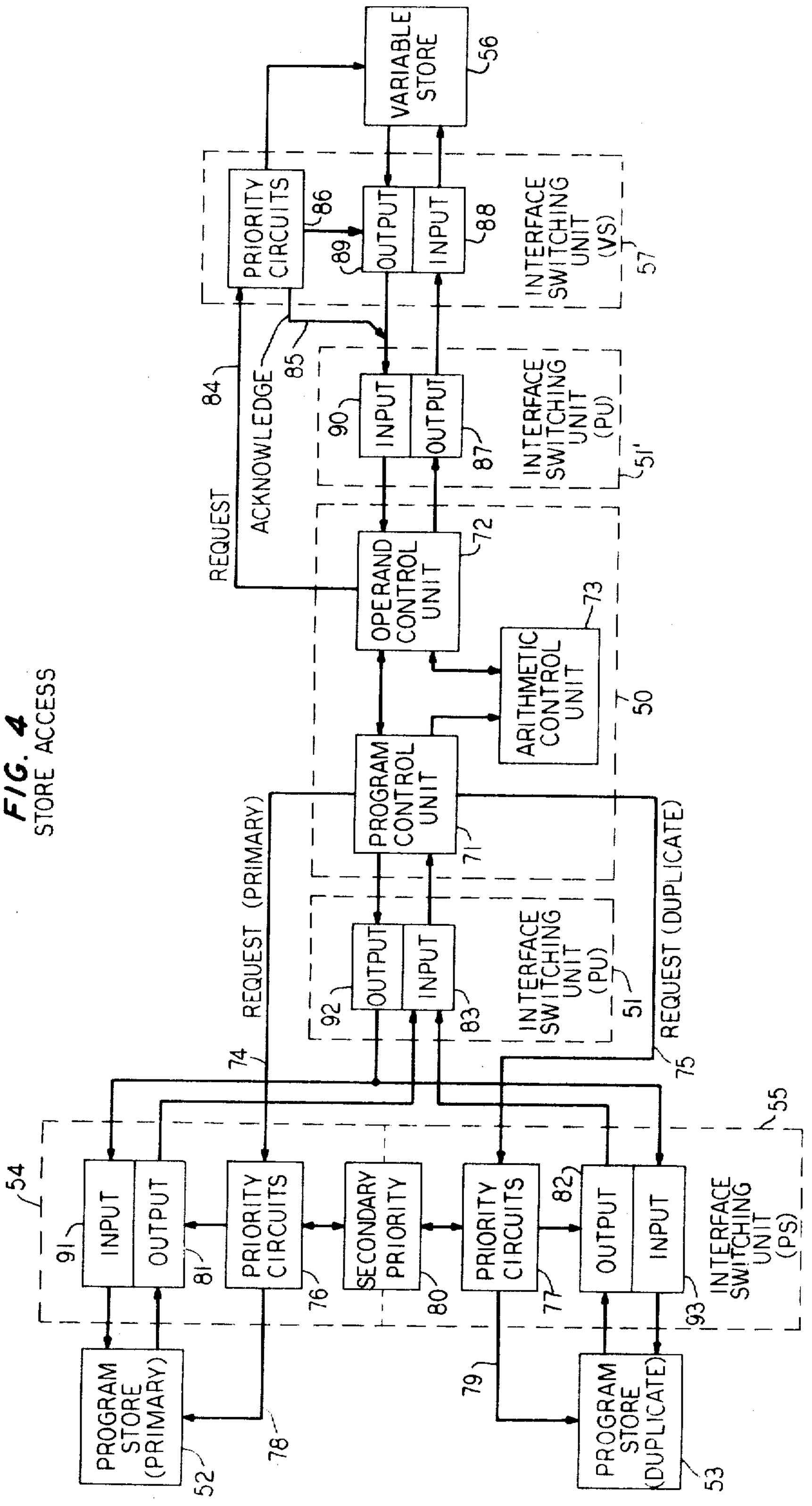
FIG. 4 is a more detailed block diagram of store access arrangements used by the processor unit of the central logic and control of FIG. 3.

In FIG. 4 there is shown a more detailed block diagram of the accessing circuits for the various store units and their relationship to the processing unit. Thus, the processing unit 50 includes a program control unit 71, an operand control unit 72 and an arithmetic control unit 73. Program control unit 71 simultaneously issues requests on leads 74 and 75 to retrieve program instructions from primary program store unit 52 and duplicate store unit 53, respectively. The request on lead 74 is applied to priority circuits 76 in interface switching unit 54. The request on lead 75 is applied to priority circuits 77 in interface switching unit 55. Priority circuits 76 and 77 form a queue of requests from the various processing units and, when requested, attach particular priorities to the request from particular units. The request which is next to be served is applied by way of lead 78 to program store unit 52 and by way of lead 79 to program store unit 53. At the same time, an indication that the request is being serviced is applied to secondary priority circuit 80. Secondary priority circuit 80 operates to remove the duplicate request from the queue of requests in the other one of priority circuits 76 and 77.

The program store unit ultimately receiving the request also receives an instruction address from program control unit 71, by way of output buffer 92 and input buffer 91 or 93. In response to this address, the appropriate program store unit 52 or 53 delivers the requested instruction to the output buffer 81 or 82 where it is routed to the appropriate one of the processing units. Thus, in FIG. 5 it is supplied to the input buffer 83 of interface switching unit 51. Input 82 serves to gather instructions requested from the various different program stores and supply these instructions to program control unit 71.

Program control unit 71 performs certain initial operations on the program instructions received from input buffer 82 and passes the instruction on to operand control unit 72 or arithmetic control unit 73. Operand control unit 72 receives the operand address portion of the instruction and issues a request on lead 84 to the addressed variable store unit to supply the data required. This request is acknowledged by way of lead 85 from priority circuit 86, which, in turn, permits operand control unit 72 to issue an address by way of output buffer 87 in interface switching unit 51′ to input buffer 88 in interface switching unit 57. This address is applied to variable store unit 56 to access the required operand which, in turn, is supplied to output buffer 89 in interface switching unit 57. This operand is transferred by way of input buffer 90 in interface switching unit 50′ to operand control unit 72. Using this operand data, arithmetic control unit 73 is then able to complete the execution of the program instruction.

It can be seen that each interface switching unit comprises buffers for receiving information from any one of a plurality of units and separate buffers for delivering information to any one of a plurality of other units. In addition, each interface switching unit includes priority circuits which are used to order the servicing of requests from the various other units.

Figure 5:
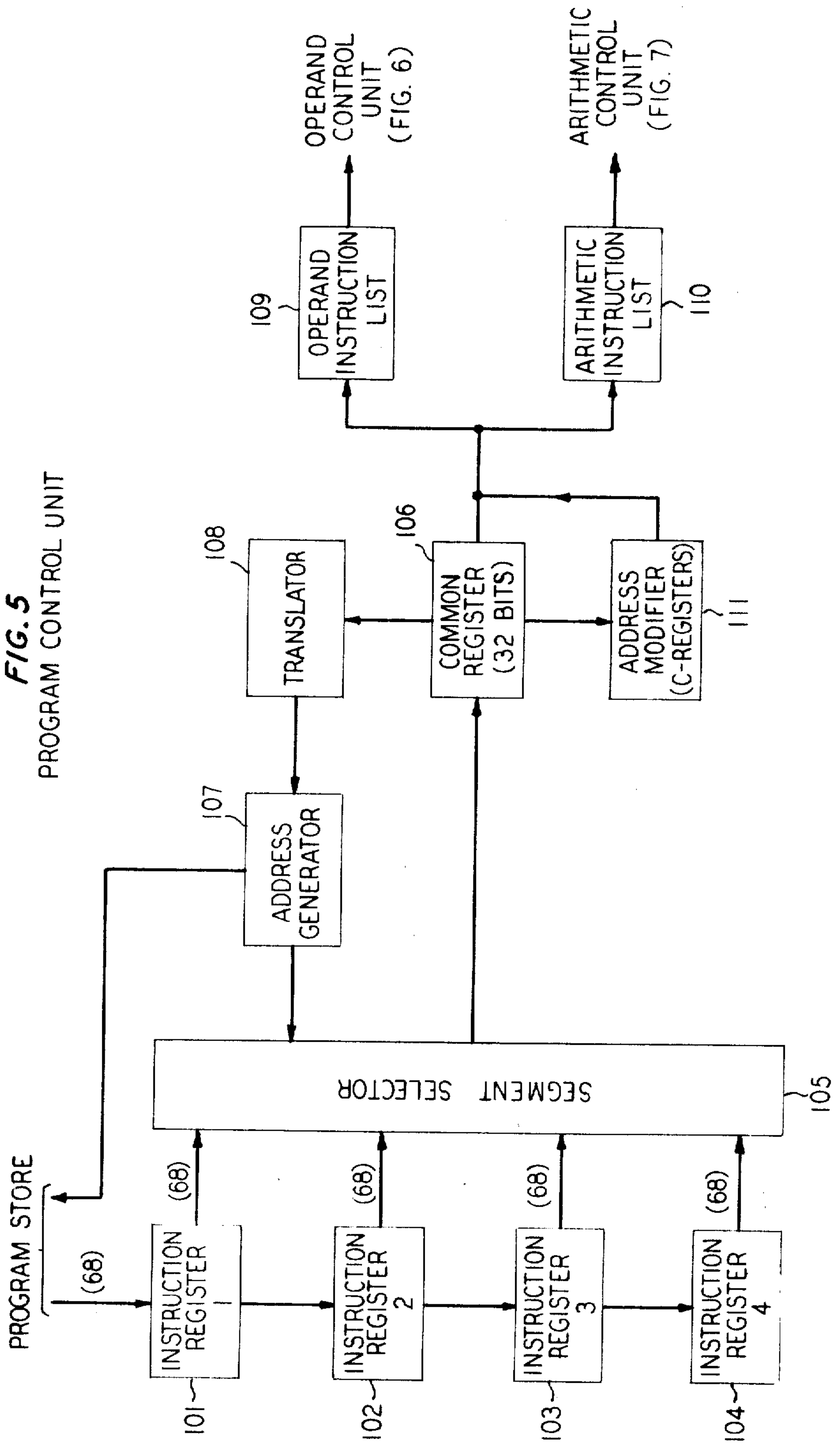
FIG. 5 is a more detailed block diagram of the program control unit of the processor unit shown in FIG. 4.

Before proceeding with the description of FIG. 5 of the drawings, it will be useful to first discuss the instruction format of the instructions received from the program store units 52 and 53 of FIG. 4. These programs store units are organized into 68-bit words. That is, each address supplied to the program store unit causes a 68-bit word to be delivered to the interface switching unit. This 68-bit word is divided into 34-bit half words which are delivered sequentially to the processing unit.

From a functional point of view, each 68-bit program store word is divided into four, 17-bit, segments each of which includes 16 bits of instruction information and one parity bit. The parity bits are discarded prior to execution of the instructions. These instructions may be in a 16-bit format or in a 32-bit format. Thus, each segment may constitute a 16-bit instruction and any two adjacent segments may constitute a 32-bit instruction. In this context, the last segment of one program store word and the first segment of the next succeeding program store word are considered to be adjacent and may constitute a single 32-bit instruction.

Referring now to FIG. 5, there is shown a schematic block diagram of the program control unit 71 (FIG. 4) forming a portion of the processing unit 50. The program control unit of FIG. 5 comprises a four-stage instruction register including registers 101, 102, 103 and 104. Each of registers 101 through 104 is capable of storing one 68-bit program store word. Program store words are initially received by instruction register 101. Normally, as program execution proceeds, the contents of instruction register 101 are transferred to instruction register 102.

The segment selector 105 transfers two adjacent segments of the word in instruction register 102, or two adjacent segments of the words in instruction registers 102 and 103, to the common register 106. When all the segments of register 102 have been transferred to common register 106, the contents of each of registers 101, 102 and 102 are transferred to the next succeeding register i.e., 101 to 102, 102 to 103 and 103 to 104. At this time, the address generator 107 generates an address to initiate the fetch of the next sequential store word for entry into instruction register 101. The original contents of register 104 are destroyed by the transfer of the contents of register 103. If instruction register 102 is emptied before the new program store word is received by register 101, then this new word is immediately transferred through register 101 to register 102.

Instruction registers 103 and 104 provide storage for so-called "short loops" in which a sequence of instructions (including up to 16 segments) can be repeated any number of times without requiring additional fetches from the program store unit. This arrangement saves a considerable amount of time otherwise necessary for the extra fetches required for repeated execution.

Each program store address includes five bits which identify the appropriate one of the program store units. The next 13 bits identify one of 8192 program store words in the program store unit. Two additional bits are utilized to identify one of the four segments of each 68-bit word. One final bit is used as a parity bit. These instruction addresses are generated by address generator 107 which includes four independent program counters. These counters can be used at different times under program control to control instruction fetching. Transfer or jump instructions operate by way of translator 108 to modify the normal sequential operation of address generator 107 in order to direct the fetching of a nonsequential program store word. It should be noted that the two segment-identifying bits are transferred to segment selector 105 and hence never leave the program control unit of FIG. 5.

Instructions in the common register 106 are analyzed to determine whether they can be executed in the program control unit itself or must be forwarded to the operand control unit or the arithmetic control unit. In the latter two cases, the instructions are placed in either one of the four-stage queueing registers called the operand instruction list 109 and the arithmetic instruction list 110. In addition, address modifying circuits 111 are provided to modify the addresses of the instructions. Address modifying circuits 111 include four-bit C-registers which are used to indicate the value of the address modification. After such modification, the instructions are passed onto instruction lists 109 and 110 as before.

Those instructions which can be retained in and executed by the program control unit of FIG. 5 are C-register manipulations, register address field modifications and jump instructions. Instructions requiring the fetching or storing of data words in the variable store units are placed in the operand instruction list 109. Instructions requiring arithmetic or logical manipulations of data normally take place in the arithmetic control unit and hence are placed in the arithmetic instruction list 110.

Figure 6:
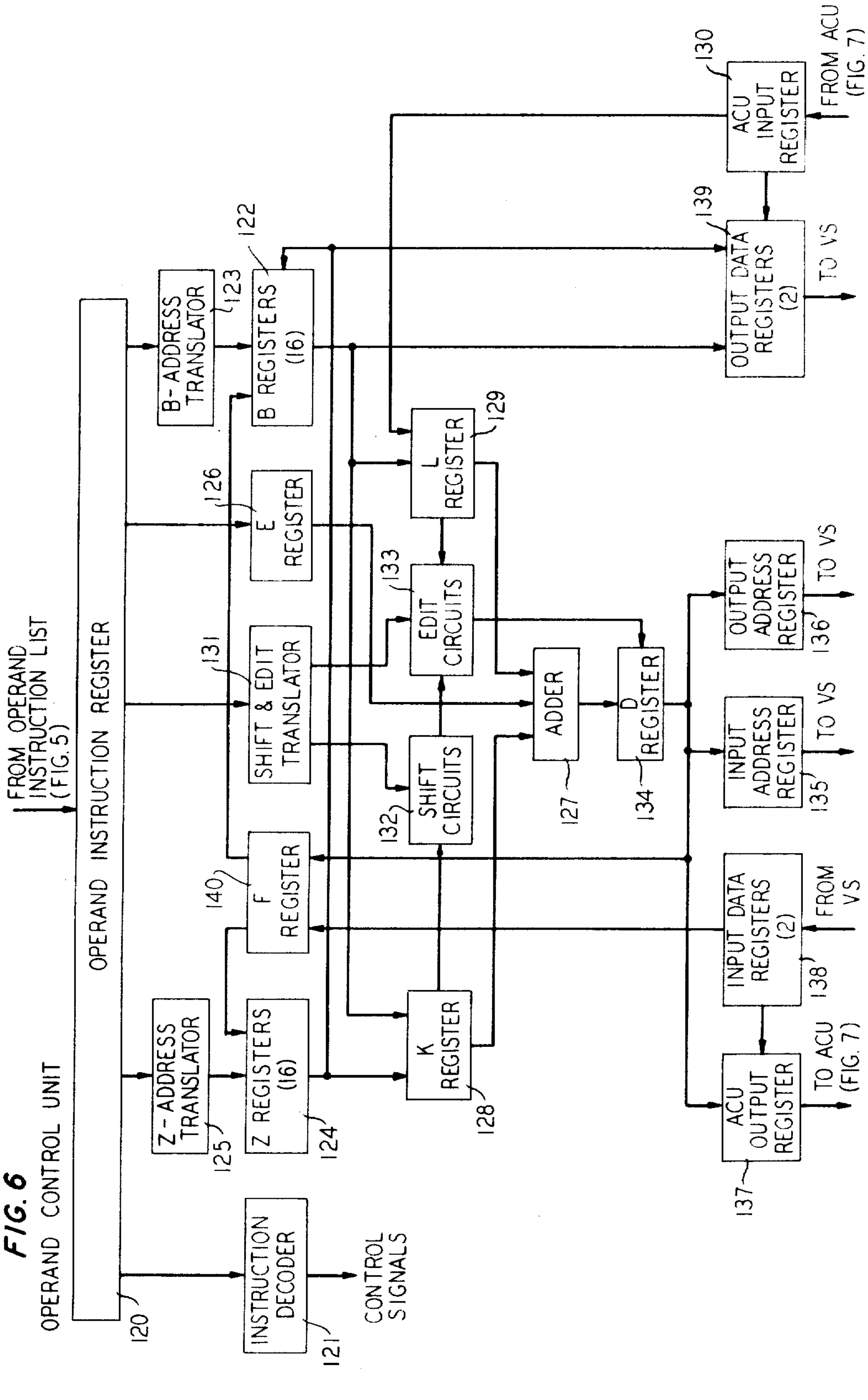
FIG. 6 is a more detailed block diagram of the operand control unit of the processor unit shown in FIG. 4.

Turning now to FIG. 6, there is shown a schematic block diagram of the operand control unit 72 (FIG. 4). The operand control unit of FIG. 6 comprises an operand instruction register 120 which receives instructions from the operand instruction list 109 in FIG. 5. The operation code portion of the instruction is supplied to instruction decoder 121 where it is decoded and control signals generated to direct the execution of the identified instruction. The operand control unit also includes 16 B-registers 122 which are used as index registers in operand address modification. A B-address translator 123 selects the appropriate one of the 16 B-registers by translating certain identifying fields of the instruction in register 120. Similarly 16 Z-registers 124 are used to store various parameters required for program interrupts. parameters include such things as the breakpoint addresses, error recovery addresses, error return addresses and other similar quantities. A Z-address translator 125 identifies one of the 16 Z-registers by translating an appropriate field of the instruction in register 120.

The E-register 126 is used to store explicit parameters which form a portion of the instruction itself. These parameters are stored in the E-register 126 prior to arithmetic operations in a three-input adder circuit 127. The K- and L-registers 128 and 129 are used to store other quantities required for the addition operation. These quantities can be derived from the B-registers 122, the Z-registers 124 or from the arithmetic control input unit register 130.

A shift and edit translator 131 translates appropriate fields of the instruction in register 120 to control shift circuits 132 and edit circuits 133 to provide shifting and editing of quantities in the various other registers.

The results of additions in adder circuit 127 are stored in D-register 134 from which they are supplied to variable store input address register 135, variable store output address register 136 or arithmetic control unit output register 137. Finally, data from the variable store units is supplied to input data registers 138 and data to be stored in the variable store units is supplied to output data registers 139. An F-register 140 is provided to store data prior to entry into Z-registers 124 or B-registers 122. This data may be received from the variable store units by way of data input registers 138 or may be available as a result of an arithmetic operation from D-register 134.

Figure 7:
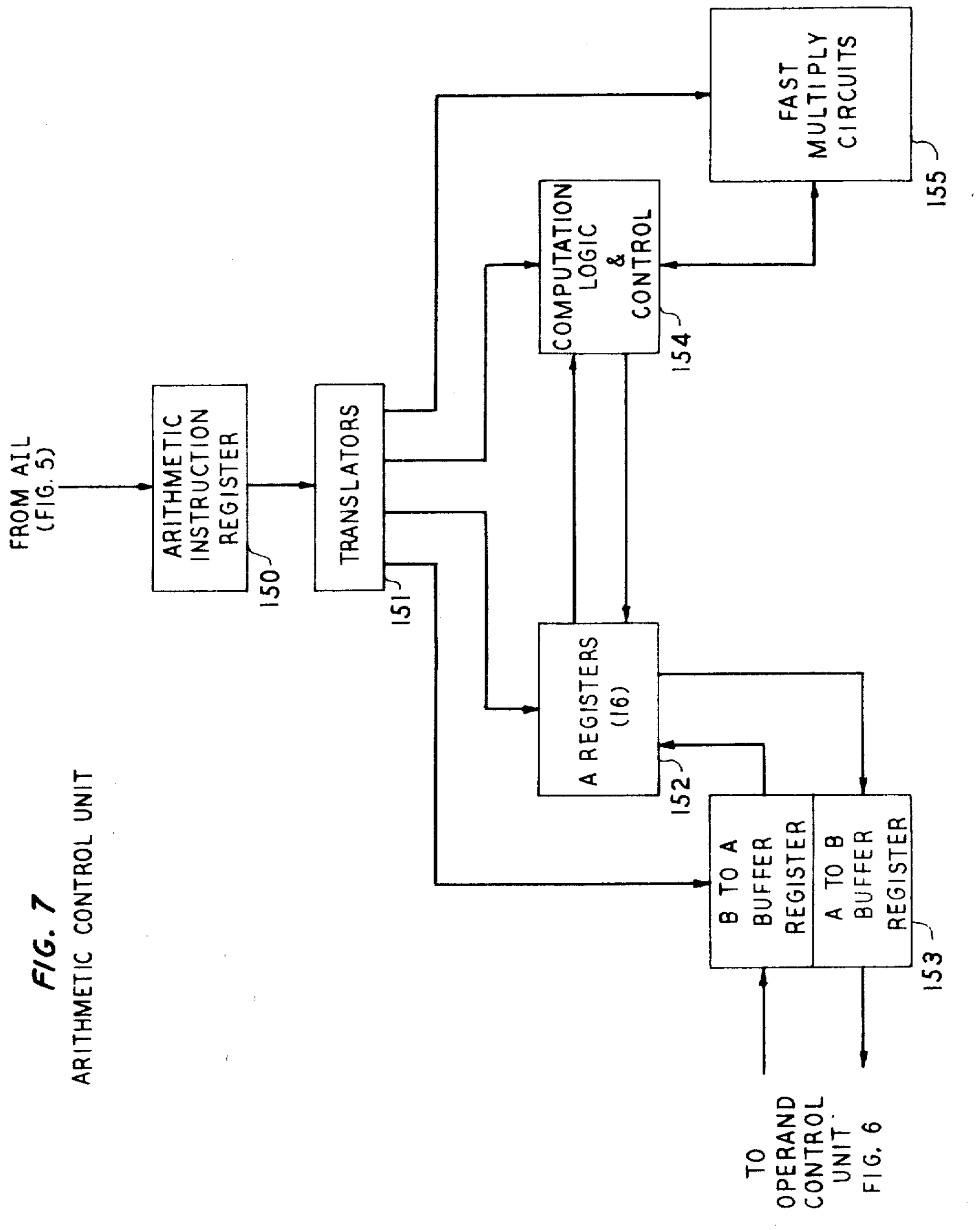
FIG. 7 is a more detailed block diagram of the arithmetic control unit of the processor unit shown in FIG. 4.

In FIG. 7 there is shown in detailed block diagram form the arithmetic control unit illustrated as block 73 in FIG. 4. The arithmetic control unit in FIG. 7 comprises an arithmetic instruction register 150 which receives arithmetic instructions from the arithmetic instruction list 110 of FIG. 5. These instructions are delivered to register 150, one at a time and, in turn, are applied to translating circuits 151. Translators 151 decode the arithmetic instructions and generate control signals necessary for the execution of those instructions.

A plurality of local storage registers, A-registers 152, are provided to store arithmetic operands during the progress of, and between the executions of, arithmetic instructions. The A-registers 152 communicate with the operand control unit of FIG. 6 by way of buffer registers 153. Operands may therefore be transferred back and forth between the operand control unit of FIG. 6 and the A-registers 152.

Also included in the arithmetic control unit of FIG. 7 are the computation logic and control circuits 154 which include all the basic logic and arithmetic control circuitry necessary to perform these operations on the operands stored in the A-registers 152. In order to prevent undue delays in the execution of arithmetic instructions, fast multiply circuits 155 are provided to provide rapid execution of instructions involving multiplication. As is well known, such instructions otherwise require considerably greater time for their execution than do other classes of instructions.

The instruction repertoire of the process or unit can be summarized as follows:

Arithmetic on A-Registers

| | | | |
|---|---|---|---|
| 1. | ADD | I,J | ADD. Add contents of register A(I) to the contents of register A(J) and store sum in A(O). |
| 2. | ADR | I,J | ADD AND REPLACE. Add contents of register A(I) to the contents of register A(J) and store the sum in A(O) and in A(J). |
| 3. | ALTR | I,J,N | ADD LEFT HALF A TRUE AND REPLACE. Add N to left half of register A(I) and store the sum in A(O) and in A(J). |
| 4. | ARTR | I,J,N | ADD RIGHT HALF A TRUE AND REPLACE. Add N to right half of register A(I) and store the sum in A(O) and in A(J). |
| 5. | SUB | I,J | SUBTRACT. Subtract the contents of register A(J) from the contents of register A(I) and store the difference in A(O). |
| 6. | SBR | I,J | SUBTRACT AND REPLACE. Subtract the contents of register A(J) from the contents of register A(I) and store the difference in A(O) and in A(J). |
| 7. | RSB | I,J | REVERSE SUBTRACT. Subtract the contents of register A(I) from the contents of register A(J) and store the difference in A(O). |
| 8. | RSR | I,J | REVERSE SUBTRACT AND REPLACE. Subtract the contents of register A(I) from the contents of register A(J) and store the difference in A(O) and in A(J). |
| 9. | SLTR | I,J,N | SUBTRACT LEFT HALF A TRUE AND REPLACE. Subtract N from the left half of register A(I) and store the difference in A(O) and in A(J). |
| 10. | SRTR | I,J,N | SUBTRACT RIGHT HALF A TRUE AND REPLACE. Subtract N from the right half of register A(I) and store the difference in A(O) and in A(J). |
| 11. | MPY | I,J | MULTIPLY. Multiply the contents of register A(I) by the contents of register A(J) and store the product in A(O)-R. |
| 12. | MPR | I,J | MULTIPLY AND REPLACE. Multiply the contents of register A(I) by the contents of register A(J) and store the product in A(O)-R and the most significant part in A(J). |
| 13. | MTR | I,J,N | MULTIPLY TRUE AND REPLACE. Multiply the contents of register A(I) by N and place the product in A(O)-R and the most significant part in A(J). |
| 14. | HMP | I,J | HALF MULTIPLY. Multiply the contents of register A(J) by the left half of the contents of register A(I) and place the product in A(O)-R. |
| 15. | HMR | I,J | HALF MULTIPLY AND REPLACE. Multiply the contents of register A(J) by the left half of the contents of register A(I) and place the product in A(O)-R and the most significant part in A(J). |
| 16. | DIV | I,J | DIVIDE. Divide the contents in register A(I)-R by the contents in register A(J) and place the quotient in A(O) with the remainder in the R register. |
| 17. | DVR | I,J | DIVIDE AND REPLACE. Divide the contents of register A(I)-R by the contents of register A(J) and place the quotient in A(O) and in A(J) (with the remainder in R). |
| 18. | SQR | I,J | SQUARE ROOT AND REPLACE. Take the square root of the contents of register A(I) and store in A(O) and in A(J). |
| 19. | RND | | ROUND. Round off the contents of register ACO), depending on the first digit of the R register. |
| 20. | MGR | I,J | MAGNITUDE AND REPLACE. Store the magnitude of the contents of register A(I) in A(O) and A(J). |
| 21. | NMR | I,J | NEGATIVE MAGNITUDE AND REPLACE. Store the negative of the magnitude of the contents of register A(I) in A(O) and A(J). |
| 22. | CNOO | I,J | COUNT NUMBER OF ONES IN A. Store the count of the number of ones in register A(I) into the last six places of A(J). |
| 23. | ENCR | I,J | ENCODE BITS IN A AND REPLACE. Shift register A(O) to the right until first "1" is encountered, place shift count in A(J), reset "1" bit, and left shift A(O) to original position. |

SHIFTS

| | | | |
|---|---|---|---|
| 24. | SHR | S | RIGHT SHIFT. Shift the contents of register A(O) or A(O)-R to the right S places with options for rounding, circular shift and sign padding. |
| 25. | SHL | S | LEFT SHIFT. Shift the contents of registers A(O) or A(O)-R to the left S places, with options for rounding and circular shifts. |
| 26. | SRI | I | RIGHT SHIFT INDIRECT. Shift contents of registers A(O) ro A(O)-R right by the lower order eight bits of the contents of register A(I), with options for rounding, circular shift and sign padding. |
| 27. | SLI | I | LEFT SHIFT INDIRECT. Shift the contents of registers A(O) or A(O)-R to the left by the lower order eight bits to the contents of A(I), with options for rounding and circular shifts. |
| 28. | SHLO | S | SHIFT LEFT WITH OVERFLOW DETECTION. Shift the contents of registers A(O) or A(o)-R to the left S places, with options, and set interrupt register bit 19 on overflow. |
| 29. | SLIO | I | SHIFT LEFT INDIRECT WITH OVERFLOW DETECTION. Shift contents of registers A(O) or A(O)-R to the left by the lower order eight bits of the contents of A(I), with options, and overflow detection in bit 19 of interrupt register. |

LOGICAL ON A

| | | | |
|---|---|---|---|
| 30. | LOR | I,J | LOGICAL OR. OR the contents of A(I) with the contents for register A(J) and store the results in register A(O). |
| 31. | LORR | I,J | LOGICAL OR AND REPLACE. OR the contents of register A(I) with the contents of register A(J) and store the results in the registers A(O) and A(J). |
| 32. | LAND | I,J | LOGICAL AND. AND the contents of register A(I) with the contents of register A(J) and store the results in the register A(O). |
| 33. | LANR | I,J | LOGICAL AND and REPLACE. AND the contents of register A(I) with the contents of register A(J) and store the results in registers A(O) and A(J). |

TRUE OPERATIONS ON A

| | | | |
|---|---|---|---|
| 34. | LLAT | J,N | LOAD LEFT HALF A TRUE. Load N into the left half of register A(J) and clear the right half. |
| 35. | LRAT | J,N | LOAD RIGHT HALF A TRUE. Load N into the right half of register A(J) and clear the left half. |
| 36. | OLTR | I,J,N | LOGICAL "OR" LEFT HALF A TRUE AND REPLACE. OR the contents of register A(I) with N, left adjusted, and place the results in registers A(O) and A(J). |

| | | | |
|---|---|---|---|
| 37. | ORTR | I,J,N | LOGICAL "OR" RIGHT HALF A TRUE AND REPLACE. OR the contents of register A(I) with N, right adjusted, and place the results in registers A(O) and A(J). |
| 38. | NLTR | I,J,N | LOGICAL "AND" LEFT HALF A TRUE AND REPLACE. AND the contents of register A(I) with N, left adjusted, and place the results in registers A(o) and A(J). |
| 39. | NRTR | I,J,N | LOGICAL "AND" RIGHT HALF A TRUE AND REPLACE. AND the contents of register A(I) with N, right adjusted, and place the results in registers A(O) and A(J). |

LOAD, ADD ON B OR Z

| | | | |
|---|---|---|---|
| 40. | LBAT | K,N | LOAD B ADDRESS TRUE. Load N, right adjusted, into B(K) and clear the balance of register B(K). |
| 41. | LBIT | K,N | LOAD B INCREMENT TRUE. Load N, left adjusted, into register B(K), leaving the balance of B(K) unchanged. |
| 42. | ABAT | K,L,N | ADD B ADDRESS TRUE. Add N to the contents of the right 20 bits of register B(K) and place the sum in the right 20bits of B(L). |
| 43. | SBAT | K,L,N | SUBTRACT B ADDRESS TRUE. Subtract N from the contents of the right 20 bits of register B(K) and place the difference in the right 20 bits of B(L). |
| 44. | NKB | K | INCREMENT B. Add the contents of bits 0–11 of register B(K) to the contents of bits 12–31 of register B(K) and place the sum in bits 12–31 of B(K). |
| 45. | ADB | K,L | ADD B. Add the contents of bits 12–31 of register B(K) to the contents of bits 12–31 of B(L) and place the sum in bits 12–31 of B(L). |
| 46. | SBB | K,L | SUBTRACT B. Subtract the contents of bits 12–31 of register B(L) from the contents of bits 12–31 of register B(K) and put the difference in bits 12–31 of B(L). |
| 47. | SBBK | K,L | SUBTRACT B INTO B(K). Subtract the contents of bits 12–31 of register B(L) from the contents of bits 12–31 of register B(K) and put the difference in bits 12–31 of register B(K). |
| 48. | LZAT | Y,N | LOAD Z ADDRESS TRUE. Load N into bits 12–31 of register Z(Y). |
| 49. | LZIT | | LOAD Z INCREMENT TRUE. Load N into bits 0–11 of register Z(Y). |

LOGICAL ON B

| | | | |
|---|---|---|---|
| 50. | BCBL | K,L | BIT CHECK INTO B(L). AND the contents of B(K) with the one's complement of the contents of register B(L) and place the results in B(L). |
| 51. | BCBK | K,L | BIT CHECK INTO B(K). AND the contents of B(K) with the one's complement of the contents of register B(L) and place the results in B(K). |
| 52. | LORB | K,L | LOGICAL "OR" B. OR the contents of register B(K) with the contents of register B(L) and place the results in B(L). |
| 53. | LERB | K,L | LOGICAL EXCLUSIVE "OR" B. EXCLUSIVE OR the contents of registers B(K) and B(L) and place the results in B(L). |
| 54. | LANB | K,L | LOGICAL "AND" B. AND the contents of register B(K) with the contents of register B(L) and place the results in B(L). |

EDIT

| | | | |
|---|---|---|---|
| 55. | EDIT | K,L,S W1,W2 | EDIT AND INSERT. Shift the contents of register B(K) right circular S places and insert the portion of B(K) between bits W1 and W2 into the corresponding positions of B(L) with the remainder of B(L) unchanged. |
| 56. | EDTS | K,L,S W1,W2 | EDIT AND STORE. Shift the contents of register B(K) right circular S places and insert the portion of B(K) between bits W1 and W2 into the corresponding positions of B(L) with the remainder of B(L) set to zero. |
| 57. | EDTP | K,L,S W1,W2 | EDIT AND PAD. Shift the contents of register B(K) right circular S places and insert the portion of B(K) between bits W1 and W2 into the corresponding positions of B(L) with the bits to the right of bit W2 set to 0 and to the left of W1 set as W1. |
| 58. | EDTA | K,J,S W1,W2 | EDIT INTO A AND PAD. Shift the contents of register B(K) right circular S places; then place bits W1 through W2 of B(K) into bits W1 through W2 of A(J). Bits to the right of bit W2 set to 0 and bits to the left of W1 set to bit W1. |
| 59. | EDII | K,L,M | EDIT INDIRECT AND INSERT. Same as EDTI except S, W1 and W2 fields are in B(M). |
| 60. | EDIS | K,L,M | EDIT INDIRECT AND STORE. Same as EDTS except S, W1 and W2 fields are in B(M). |
| 61. | EDAS | K,J,S, W1,W2 | EDIT INTO A AND STORE. Same as EDTS except bits into register A(J) instead of B(L). |
| 62. | EIAS | K,J,M | EDIT INDIRECT INTO A AND STORE. Same as EDAS except S, W1 and W2 fields are in B(M). |
| 63. | EDIP | K,L,M | EDIT INDIRECT AND PAD. Same as EDTP except S, W1 and W2 fields are in B(M). |
| 64. | EIAP | K,J,M | EDIT INDIRECT INTO A AND PAD. Same as EDTA except S, W1 and W2 fields are in B(M). |

MOVES

| | | | |
|---|---|---|---|
| 65. | CMA | I | CLEAR R AND MOVE A. Move the contents of register A(I) into register A(O) and clear R. |
| 66. | CMN | I | CLEAR R AND MOVE A NEGATIVE. Move the negative of the contents of register A(I) into the register A(O) and clear R. |
| 67. | XCH | | EXCHANGE. Move the contents of register A(O) into R and move the contents of (R) into A(O). |
| 68. | ICA | I,J | INTERCHANGE A. Move the contents of register A(I) into the register A(J) and move the contents of register A(J) into A(I). |
| 69. | PAR | I | PLACE IN R. Move the contents of register A(I) into R. |
| 70. | LAR | J | LOAD FROM R. Load the contents of register R into A(J). |
| 71. | MVA | I,J | MOVE A. Move the contents of register A(I) into A(J). |
| 72. | MAB | I,L | MOVE A TO B. Move the contents of register A(I) to B(L). |
| 73. | MBA | K,J | MOVE B TO A. Move the contents of register B(K) into register A(J). |
| 74. | MVB | K,L | MOVE B. Move the contents of register B(K) into register B(L). |
| 75. | MBC | P1,L | MOVE B TO C. Move the contents of bits 28–31 of register B(L) into register C(G), where G is right two bits of P1. |
| 76. | MCB | P1,L | MOVE C TO B. Move the contents of register C(G), where G is the right two bits of P1, into bits 28–31 of register B(L) and clear bits 0–27 of register B(L). |
| 77. | MBZ | K,Y | MOVE B TO Z. Move the contents of register B(K) into the register Z(Y). |
| 78. | MZB | Y,L | MOVE Z TO B. Move the contents of register Z(Y) into register B(L). |
| 79. | ONRA | J,L | ONRS TO A. Place the inverse of the contents of register B(L) into register A(I). If L=0, load all one's into A(I) |

80. ONRB K,L ONRS TO B. PLace the inverse of the contents of register B(L) into register B(K). If L=0, load all one's into B(K).

FETCHES

81. FDA K,J, M,U FETCH INTO A DIRECT. Fetch the contents of the variable store half word location specified by the sum of the contents of registers B(K), B(M), and U and store in register A(J).

82. DFDA K,J(2), M,U DOUBLE FETCH INTO A DIRECT. Fetch the contents of the variable store full word location specified by the sum of the contents of registers B(K), B(M) AND U and store in registers A(J)–A(J+1) (J must be even).

83. FBN K,L, M,U FETCH AND BIAS NEGATIVE. Load contents of variable store half word location specified by the sum of registers B(K), B(M) and U into B(L). Rest bits 0 and 1 of variable store location with ones.

84. DFBN K,L, M,U DOUBLE FETCH AND BIAS NEGATIVE. Load contents of variable store full word location specified by the sum of registers B(K), B(M) and U into B(L)–B(L+1). L must be even. Reset bits 0 and 1 of variable store location to ones.

85. FIA K,J, M,U FETCH INTO A INDIRECT. Fetch contents variable store half word location specified by the sum of registers B(K), B(M) and U. If bit 3 is 1, continue fetching, using corresponding fields K, M, and U. When bit 3 is 0, load contents of that variable store location into A(J). Final address is in B(M).

86. DRIA K,J, M,U DOUBLE FETCH INTO A INDIRECT. Same as above for full word, which is loaded into A(J)–A(J+).

87. FDB K,L, M,U FETCH INTO B DIRECT. Load contents of variable store half word location specified by the sum of the contents of registers B(K), B(M) and U into register B(L).

88. FDZ K,Y, M,U FETCH INTO Z DIRECT. Load contents of variable store half word location specified by the sum of the contents of registers B(K), B(M) and U into register Z(Y).

89. DFDB K,L, M,N DAUBLE FETCH INTO B DIRECT. Load contents of variable store full word location specified by the sum of the contents of registers B(K), B(M) and U into B(L)–B(L+1).

90. DFDZ K,Y, M,U DOUBLE FETCH INTO Z DIRECT. Load contents of variable store full word location specified by the sum of the contents of registers B(K), B(M) and U into Z(Y)–Z(Y+1).

91. FIB K,L, M,U FETCH INTO B INDIRECT. Fetch contents of variable store half word location specified by the sum of contents of registers B(K), B(M) and U. If bit 3 is one, continue fetching using K, M and U fields of fetched words. When bit 3 is a zero, load contents of the variable store location specified by that word into register B(L).

92. DFIB K,L, M,U DOUBLE FETCH INTO B INDIRECT. Same as above for full word, which is loaded into B(L)–B(L+). L must be even.

93. FOBA K,U FETCH INTO B ABSOLUTE. Fetch the contents of the variable store half word location specified by U into register B(K).

94. DFBA K,U DOUBLE FETCH INTO B ABSOLUTE. Same as FOBA for full word, which is loaded into B(K)–B(K+).

STROES

95. SDA K,J, M,U STORE FROM A DIRECT. Store the contents of register A(J) in the variable store half word location specified by the sum of the contents of B(K), B(M) and U.

96. DSDA K,J, M,U DOUBLE STORE FROM A DIRECT. Store the contents of registers A(J)–A(J+) into the variable store full word location specified by the sum of the contents of registers B(K), B(M) and U. J must be even.

97. SIA K,J, M,U STORE FROM A INDIRECT. Fetch the contents of the variable store half word location specified by the sum of the contents of registers B(K), B(M) and U. If bit 3 is 1, continue fetching, using K, M and U fields of fetched words. When bit 3 is 0, store A(J) in variable store location specified by that word.

98. DSIA K,J, M,U DOUBLE STORE FROM A INDIRECT. Same as above for full word, which is stored from A(J)–A(J+) into the last specified variable store location.

99. SDB K,L, M,U STORE FROM B DIRECT. Store contents of register B(L) into the variable store half word location specified by the sum of the contents of B(K), B(M) and U.

100. SDZ K,Y, M,U STORE FROM Z DIRECT. Store contents of register Z(Y) into the variable store half word location specified by the sum of the contents of B(K), B(M) and U.

101. DSDB K,L, M,U DOUBLE STORE FROM B DIRECT. Store the contents of registered B(L)–B(L+) into the variable store full word location specified by sum of the contents of B(K), B(M) and U. L must be even.

102. DSDZ K,Y, M,U DOUBLE STORE FROM Z DIRECT Store the contents of registers Z(Y)–Z(Y+1) into the variable store full word location specified by the sum of the contents of B(K), B(M) and U. L must be even.

103. DCSB K,L, M,U DOUBLE CONDITIONAL STORE. Store the contents of registers B(L)–B(L+) into the variable store full word location specified by the sum of the contents of B(L), B(M) and U, but *only* if the first two bits of the storage location are not "11."a L must be even.

104. SIB K,L, M,U STORE FROM B INDIRECT. Fetch the contents of the variable store half word location specified by the sum of the contents of B(K), B(M) and U. If bit 3 is 1, continue fetching, using new K, M and U fields of fetched words. When bit 3 is 0, store contents of B(L) in the last specified variable store locations.

105. DSIB K,L(2), M,U DOUBLE STORE FROM B INDIRECT. Same as above for full word stored from B(L)–B(L+1) into last specified variable store location.

| | | | |
|---|---|---|---|
| 106. | SOBA | K,U | STORE FROM B ABSOLUTE. Store the contents of register B(K) at the variable store half word location specified by U. |
| 107. | DSBA | K,U | DOUBLE STORE FROM B ABSOLUTE. Store the contents of registers B(K)–B(K+1) into the variable store full word location specified by U. K must be even. |

JUMPS

| | | | |
|---|---|---|---|
| 108. | UCJ | U | UNCONDITIONAL JUMP. The program control unit jumps to address in U. |
| 109. | UJM | K,U | UNCONDITIONAL JUMP MODIFIED. Jump to U+B(K). |
| 110. | SRJ | K,U | SUBROUTINE JUMP. Next instruction address into B(K) and jump to U. |
| 111. | JAE | I,U | CONDITIONAL JUMP IF A EQUAL. Jump to U if I=0 and A(O)=0, or if I ≠ 0 and A(O)=A(I). |
| 112. | JANE | I,U | CONDITIONAL JUMP IF A NOT EQUAL. Jump to U if I=0 and A(O) ≠ 0, or if I ≠ 0 and A(I) ≠ A(O). |
| 113. | JAG | I,U | CONDITIONAL JUMP IF A GREATER. Jump to U if I=0 and A(O)>0, or if I ≠ 0 and A(I)>A(O). |
| 114. | JANG | I,U | CONDITIONAL JUMP IF A NOT GREATER. Jump to U if I=0 and A(O)≤ 0, or if I ≠ 0 and A(I) ≤ A(O). |
| 115. | JAL | I,U | CONDITIONAL JUMP IF A LESS. Jump to U if I=0 and A(O)<0, or if I ≠ 0 and A(O). |
| 116. | JANL | I,U | CONDITIONAL JUMP IF A NOT LESS. Jump to U if I=0 and A(O)≥ 0, or if I ≠ 0 and A(I) ≥ A(O). |
| 117. | JBAZ | K,U | CONDITIONAL JUMP IF B ADDRESS ZERO. Jump to U if bits 12–31 of register B(K) equal zero. |
| 118. | JBAN | K,U | CONDITIONAL JUMP IF B ADDRESS NOT ZERO. Jump to U if bits 12–31 of register B(K) are not equal to zero. |
| 119. | JBZ | K,U | CONDITIONAL JUMP IF B ZERO. Jump to U if B(K) equals zero (bits 0–31). |
| 120. | JBNZ | K,U | CONDITIONAL JUMP IF B NOT ZERO. Jump to U if B(K) ≠ 0(bits 0–31). |
| 121. | JBG | K,U | CONDITIONAL JUMP IF B GREATER THAN ZERO. Jump to U if B(K) > 0 (bits 0–31). |
| 122. | JBNG | K,U | CONDITIONAL JUMP IF B NOT GREATER THAN ZERO. Jump to U if B(K) ≤ 0 (bits 0–31). |
| 123. | JBL | K,U | CONDITIONAL JUMP IF B LESS THAN ZERO. Jump to U if B(K)<0 (bits 0–31). |
| 124. | JBNL | K,U | CONDITIONAL JUMP IF B NOT LESS THAN ZERO. Jump to U if B(K) ≥ 0 (bits 0–31). |
| 125. | JCZ | P1,V | CONDITIONAL JUMP C ZERO. Jump to U if C(G1)=0. G1 specified by right two bits of P1 field. |
| 126. | JCNZ | P1,U | CONDITIONAL JUMP C NOT ZERO. Jump to U if C(G1) ≠ 0. G1 specified by right two bits of P1 field. |
| 127. | IJCZ | P1,U | INDEX JUMP C ZERO. Jump to U if C(G1)=0 and increment C(G1) by second bit of P1. G1 specified by right two bits of P1. |
| 128. | IJCN | P1,U | INDEX JUMP C NOT ZERO. Jump to U if C(G1) ≠ 0 and increment C(G1) by second bit of P1. G1 is specified by the right two bits of P1. |
| 129. | IJO | K,U | INDEX JUMP ADDRESS OVERFLOW. Jump to U if overflow occurs during indexing. Prior to jump decision, the signed quantity in bits 0–11 of B(K) is subtracted from bits 12–31 of B(K). The result is placed into bits 12–31 of B(K). |
| 130. | IJNO | K,U | INDEX JUMP NOT ADDRESS OVERFLOW. Jump to U of overflow does not occur during indexing. Prior to jump decision, the signed quantity in bits 0–11 of B(K) is subtracted from bits 12–31 of B(K). The result is placed into bits 12–31 of B(K). |
| 131. | RJP | K | RETURN JUMP. Jump to B(K) |
| 132. | IRJ | Y | INTERRUPT RETURN JUMP. Jump to Z(Y) |
| 133. | INTJ | Y | INTERRUPT JUMP. Jump to location specified by bits 12–31 of register Z(Y). The next instruction address is in Z(Y+1). Z(Y) must be either $Z_2$ or $Z_4$. |

C REGISTER MANIPULATION

| | | | |
|---|---|---|---|
| 134. | LCT | P1,P2 | LOAD C TRUE. Load the P2 field into the C register specified by the right two bits of the P1 field. |
| 135. | INC | P1,P2 | INCREMENT C. Increment the C registers specified by the right two bits of P1 and P2 by the amount specified in the corresponding left two bits of P1 and P2. |
| 136. | MRA | P1,P2 | MODIFY REGISTER ADDRESS. Increment the C register fields I, K or Y (bits 8–11) and J, L, or Y (bits 12–15) of the next succeeding instruction each to be modified by the amounts in the corresponding C registers. |

FLOATING POINT ARITHMETIC

| | | | |
|---|---|---|---|
| 137. | FAD | I,J | FLOATING ADD. Floating point add the contents of register A(I) to the contents of register A(J) and store the normalized sum in A(O). |
| 138. | FSB | I,J | FLOATING SUBTRACT. Floating point subtract the contents of register A(J) from the contents of register A(I) and store the normalized difference in A(O). |
| 139. | FAR | I,J | FLOATING ADD AND REPLACE. Floating point add the contents of register A(I) to the contents of register A(J) and store the normalized sum in A(O) and A(J). |
| 140. | FSR | I,J | FLOATING SUBTRACT AND REPLACE. Floating point subtract the contents of register A(J) from the contents of register A(I) and store the normalized difference in A(O) and A(J). |
| 141. | FMY | I,J | FLOATING MULTIPLY. Floating point multiply the contents of register A(I) by the contents of register A(J) and store the normalized product in A(O)-R. |
| 142. | FMR | I,J | FLOATING MULTIPLY AND REPLACE. Floating point multiply the contents of register A(I) by the contents of register A(J) and store the normalized product in A(O)-R and A(J). |
| 143. | FDV | I,J | FLOATING DIVIDE. Floating point divide the contents of register A(I) by the contents of register A(J) and store the normalized quotient in A(O) (with the remainder in R). |
| 144. | FDR | I,J | FLOATING DIVIDE AND REPLACE. Floating point divide the contents of register A(I) by the contents of register A(J) and store the normalized quotient in A(O) and A(J) (with the remainder in R). |
| 145. | RFS | I,J | REVERSE FLOATING SUBTRACT. Floating point subtract the contents of register A(I) from the contents of register A(J) and store the normalized difference in A(O). |
| 146. | RFSR | I,J | REVERSE FLOATING SUBTRACT AND REPLACE. Floating point subtract the contents of register A(I) from the contents of register A(J) and store the normalized difference in A(O) and A(J). |
| 147. | FSQR | I,J | FLOATING SQUARE ROOT AND REPLACE. Take the floating point square root of the contents of register A(I) and store in A(O) and A(J). |
| 148. | FRN | | FLOATING ROUND. Round off the contents of register A(O), depending on the first digit of the R register. |

| | | | |
|---|---|---|---|
| 149. | FMGR | I,J | FLOATING MAGNITUDE AND REPLACE. Store the floating point magnitude of the contents of register A(I) in A(O) and in A(J). |
| 150. | AFTR | I,J,N | ADD A FLOATING TRUE AND REPLACE. Add N to the floating point contents of register A(I) and store the normalized sum in A(O) and in A(J). |
| 151. | SFTR | I,J,N | SUBTRACT A FLOATING TRUE AND REPLACE. Subtract N from the floating point contents of register A(I) and store the normalized difference in A(O) and in A(J). (Bits 16–23 of N are mantissa, bits 24–31 of N are exponents). |
| 152. | MFTR | I,J,N | MULTIPLY FLOATING TRUE AND REPLACE. Floating point multiply the contents of register A(I) by N and place the normalized product in A(O)—R and in A(J). |

FLOATING POINT CONDITIONAL JUMPS

| | | | |
|---|---|---|---|
| 153. | JFG | I,U | CONDITIONAL JUMP IF FLOATING COMPARISON GREATER. Jump to U if I=0 and floating point A(O)>0, or if I ≠ 0 and floating point A(I)>A(0). |
| 154. | JFNG | I,U | CONDITIONAL JUMP IF FLOATING COMPARISON NOT GREATER. Jump to U if I=0 and floating point A(O) ≤ 0, or if I ≠ 0 and floating point A(I) ≤ A(O). |
| 155. | JFL | I,U | CONDITIONAL JUMP IF FLOATING COMPARISON LESS. Jump to U if I=0 and floating point A(O)<Ø, or I≠ 0 and floating point A(I)<A(O). |
| 156. | JFNL | I,U | CONDITIONAL JUMP IF FLOATING COMPARISON NOT LESS. Jump to U IF I = 0 and floating point A(O) ≥ 0, or if I ≠ 0 and floating point A(I) ≥ A(O). |
| 157. | JFZ | I,U | CONDITIONAL JUMP FLOATING ZERO. Jump to U if I=0 and floating point A(O)=0 or if I ≠ 0 and floating point A(O)=A(I). |
| 158. | JFNZ | I,U | CONDITIONAL JUMP FLOATING NOT ZERO. Jump to U if I=0 and floating point A(O) ≠ 0, or if I ≠ 0 and floating point A(O) ≠ A(I). |

EXPONENT MANIPULATION

| | | | |
|---|---|---|---|
| 159. | MVX | I,J | MOVE EXPONENT. Combine the exponent in A(I) with the mantissa in A(J) and store the results in A(O) and A(J). |
| 160. | ADX | I,J | ADD EXPONENT. Add the exponents in A(I) and A(J). Place the results in A(O), retaining the mantissa from A(J). |
| 161. | AXR | I,J | ADD EXPONENT AND REPLACE. Add the exponents in A(I) and A(J). Place the results in A(O) and A(J), releasing the mantissa from A(J). |
| 162. | MAX | I,J | MATCH EXPONENTS. Shift the exponent in register A(I) until the exponent matches the exponent of A(J). Place the result in A(O). |
| 163. | MXR | I,J | MATCH EXPONENTS AND REPLACE. Shift the exponent in register A(I) until the exponent matches the exponent of A(J). Place the results in A(O) and A(J). |
| 164. | NRM | I,J | NORMALIZE AND REPLACE. Shift the mantissa in A(I) to the left until normalized, adjust the exponent, and place the result in A(O) and A(J). |
| 165. | AXTR | I,J,N | ADD EXPONENT TRUE AND REPLACE. Add N to the exponent in A(I) and store the resulting floating point number in A(O) and A(J). |
| 166. | RSX | I,J | REVERSE SUBTRACT EXPONENTS. Subtract the exponent in A(I) from the exponent in A(J) and place the results with the mantissa of A(J) in A(O). |

| | | | |
|---|---|---|---|
| 167. | RSXR | I,J | REVERSE SUBTRACT EXPONENTS AND REPLACE. Subtract the exponent in A(I) from the exponent in A(J) and place the result with the mantissa of A(J) in A(O) and A(J). |
| 168. | UPAK | I,J | UNPACK. Convert the floating point number in A(I) to a fixed point number and place in A(O). |

LOAD FLOATING TRUE

| | | | |
|---|---|---|---|
| 169. | LFAT | J,N | LOAD FLOATING A TRUE. Load the floating point number N into A(J). Note that N includes only an 8-bit mantissa and the remaining 16 mantissa bits are filled in with zeros. |
| 170. | LXTR | I,J,N | LOAD EXPONENT TRUE AND REPLACE. Replace the exponent in A(I) with N and place the results in A(O) and A(J). |

CONTROL

| | | | |
|---|---|---|---|
| 171. | NOP | | NO OPERATION. Continue to next instruction. |
| 172. | HLT | | HALT. Stop the operation of the processor (Requires manual restart). |
| 173. | EDS | K,U | ENABLE DUPLICATE PROGRAMS AND JUMP. Issue all subsequent program store fetches to the paired program store groups and jump to the program store location specified by the sum of the contents of register B(K) and U. |
| 174. | IDS | K,U | INHIBIT DUPLICATE PROGRAMS AND JUMP. Disable duplicate fetches commenced by EDS and jump to program store location specified by the sum of the contents of register B(K) and U. |
| 175. | RIL | Y,L | REMOVE INTERRUPT LOCKOUT. Load the contents of register Z(Y) into bits 12–31 of register B(L). (Clears interrupt lockout). |
| 176. | LPC | K Δ Δ | LOAD FROM PROGRAM COUNTER. Add 1 to current instruction address and place the new address in the address field of B(K). |
| 177. | PMT | K,U | PROGRAM MEMORY TEST. Check program store memory locations beginning at the location specified by the sum of register B(K) and U for a parity error or until the next location is that specified by the contents of the breakpoint address register. |
| 178. | SYNC | | SYNCHRONIZE. Stop sequencing until all instruction execution in progress is completed; then continue. |
| 179. | SML | | SET MASK LOCKOUT. Lockout all noncritical interrupts for 64 microseconds. Lockout removed if IRJ or RIL are executed. |

Figure 8:
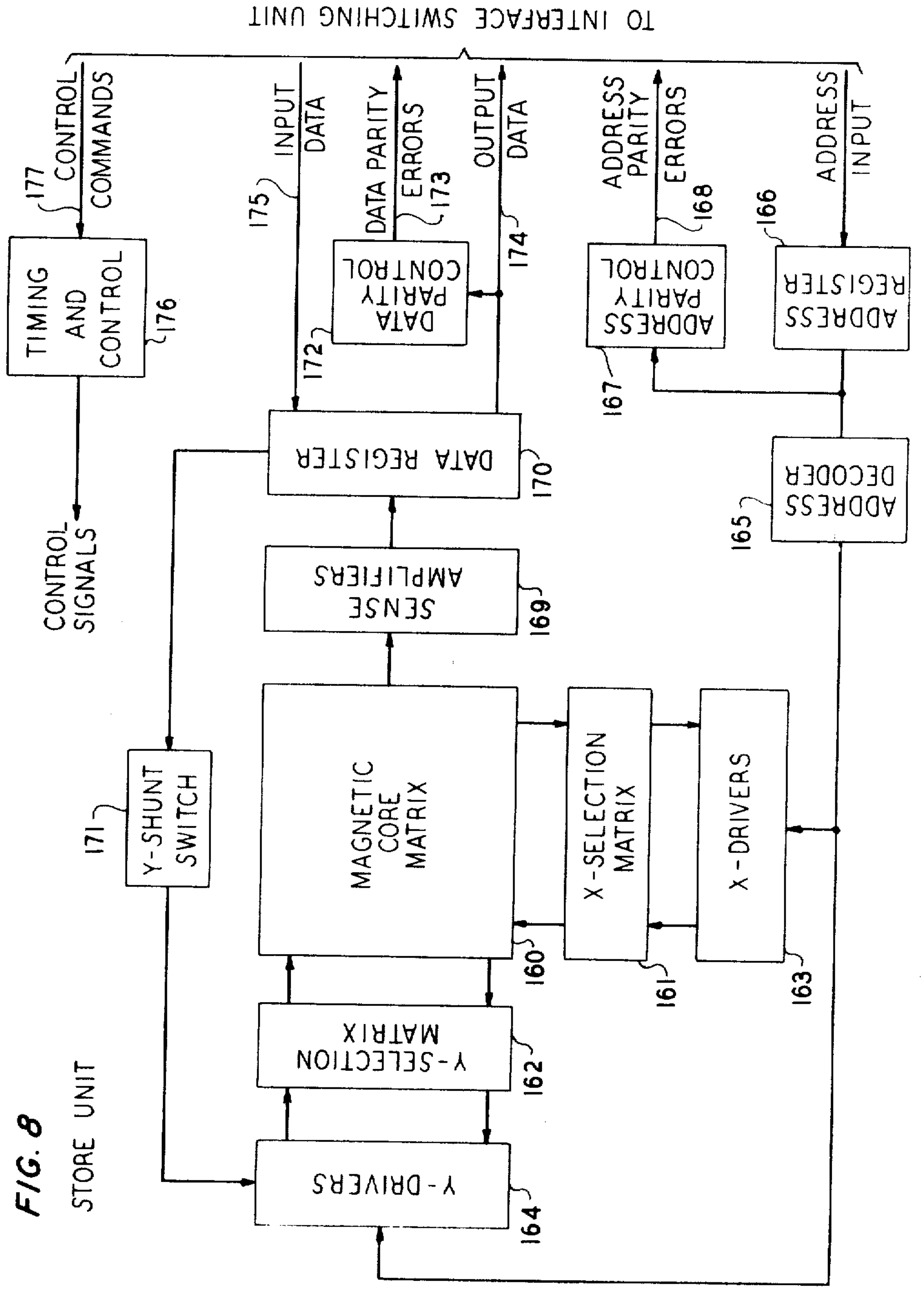
FIG. 8 is a more detailed block diagram of store units shown in FIG. 4.

Referring now to FIG. 8, there is shown a detailed block diagram of the store units illustrated in FIG. 4 by blocks 52, 53 and 56. The variable store units and the program store units comprise substantially identical storage hardware. The major difference between these stores is the duplication of all entries in the program store units. This difference results in some variation in the control circuitry and the control signaling but has little effect on the nature or operation of the storage hardware itself.

Referring then to FIG. 8, there is shown a store unit comprising a magnetic core matrix 160 including an array of magnetic cores and associated control conductors threading those cores, all in accordance with practices well known in the art. The magnetic cores of matrix 160 are addressed in accordance with conventional 2½D practice by coincident signals from X-selection matrix 161 and Y-selection matrix 162.

During the read cycle, a half-select current is driven on the selected line of X-matrix 161 and a half-select current is also driven on those ones of the lines of Y-matrix 162 in each bit position, forcing the selected magnetic cores 160 to the "0" state. During the write cycle, a half-select current is driven on the selected line of X-matrix 161 and a conditional additive half-select current is applied to the selected lines of Y-matrix 162 in each bit position to force the core to the "1" state. The conditional additive current is applied selectively to the Y-matrix 162 lines in each bit position by way of the Y-shunt switch 171. Since data is inserted in each bit position of a selected word by means of logically or conditionally selecting an additive half-select current, an independent Y-matrix 162 must be used for each bit position of the memory.

These selection matrices 161 and 162, are, in turn, driven by X-drivers 163 and Y-drivers 164, respectively. The drivers 163 and 164 receive address information from address decoder 165 which, in turn, receives the memory address from address register 166. These addresses are, of course, supplied to the store unit of FIG. 8 from store accessing circuits in other parts of the data processing system. All addresses stored in register 166 are checked for parity errors in address parity control circuit 167. Any errors detected in these addresses are reported by way of line 168.

Magnetic core matrix 160, when addressed from matrices 161 and 162, produces outputs representative of the binary information stored in the addressed location. These signals are detected by sense amplifiers 169 and the binary information is stored in data register 170. Since the reading of information from the magnetic cores results in the destruction of that information, the same information is applied selectively to the bit lines by way of Y-shunt switch 171 to restore the information to the same locations in magnetic cores 160. In this way, readout is made nondestructive and the information stored in matrix 160 is retained for further utilization.

All data stored in magnetic core matrix 160 includes parity control bits which may be used to verify the parity of the stored data. Each data word stored in register 170 is therefore checked for correct parity by data parity control circuits 172 and data parity errors reported by way of line 173. The data itself is delivered by way of line 174.

When it is desired to store information in the store unit of FIG. 8, this input data is delivered by way of line 175 and stored in data register 170. At the same time, address signals are delivered to address register 166 indicating the precise location in which the input data is to be stored. The information previously stored at the address location in the magnetic cores 160 is first read from the magnetic cores 160, resulting in the destruction of that information. The resulting signals are not detected by the sense amplifiers 169 for this case. The input data stored in data register 170 is delivered by way of the Y-shunt switch 171 to the magnetic core matrix 160 in synchronism with the address control signals generated by address decoder 165, drivers 163 and 164 and selection matrices 161 and 162. In this way, input information is stored in matrix 160 for further utilization. The input data is also checked for parity errors by parity control circuits 172 and parity errors reported on line 173.

The operation of all of the circuits of FIG. 8 are under the control of signals generated by timing and control circuit 176. Control circuit 176 is, in turn, directed by control commands on line 177 in such a manner as to generate the appropriate control signals at the proper times and in the appropriate sequence. In order to better understand the operation of the store unit of FIG. 8, these control commands will be described in greater detail.

It will be first noted that each word in matrix 160 comprises 68 bits of binary information which, in turn, each comprise a left byte (bits 0–33) and a right byte (bits 34–67). The memory is capable of delivering either one of these bytes in response to a byte request and, moreover, detects and reports data parity errors separately for each byte. Finally, the store unit of FIG. 8 is provided with the capability of a biased read, i.e., is capable of setting the first and second bits of an addressed word to "1's" during any read cycle. These bits can then be used by the external system to recognize that the word has previously been read from memory. The store unit is also capable of altering a read cycle to a write cycle following the read portion of any memory cycle upon signals from the external system. This latter capability is called "conditional store."

The control commands delivered to control circuits 176 therefore include left, right and both byte signals as well as biased read and conditional and normal store signals. These control commands operate in circuits 176 to generate the detailed timing and control signals which act to effectuate the desired actions.

Signals delivered to and recovered from the store unit of FIG. 8 are handled through an interface switching unit indicated at the right side of FIG. 8. This interface switching unit forms a physical part of the store unit and performs the function of a buffer between the store unit and the various other units requesting service from the store unit. Since all such interface switching units have the same function and are of similar construction, only one type of interface switching unit will be described in detail. Thus, in FIG. 9 there is shown a detailed block diagram of the variable store interface switching unit shown as block 57 in FIG. 4.

Figure 9:
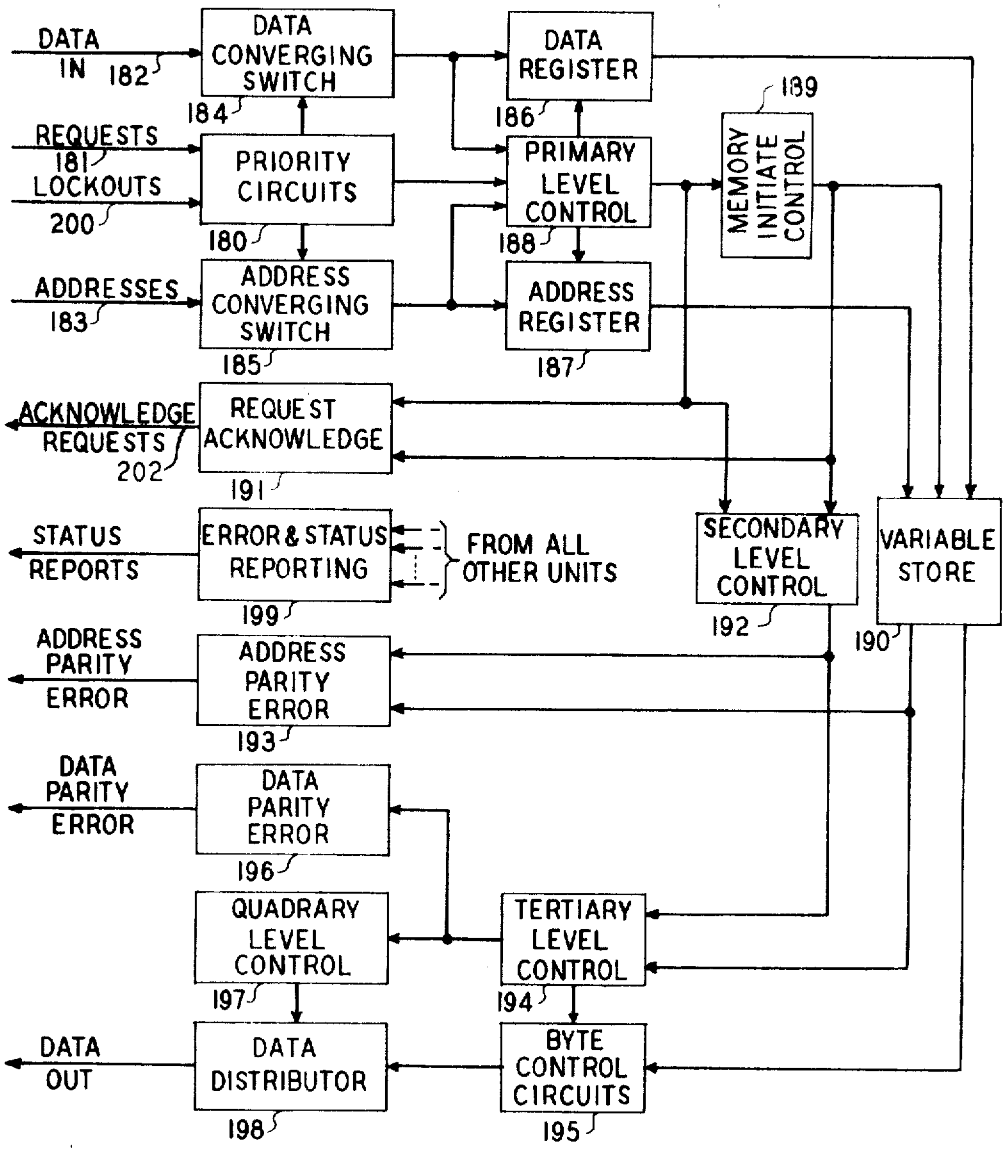
FIG. 9 is a more detailed block diagram of the interface switching unit shown in FIG. 4.

The interface switching unit of FIG. 9 comprises priority circuits 180 to which are applied requests for service on leads 181. It will be recalled, as noted in connection with FIG. 3, that the variable store units receive requests for service from processor units and input-output controllers. These requests are applied to priority circuits 180 and that request having the highest priority is given service first. That is, that data appearing on line 182 and that address appearing on line 183 which are associated with the highest priority request on leads 181 are selected by data converging switch 184 and address converging switch 185, respectively, and stored in data register 186 and address register 187, respectively. At the same time, control signals associated with that request are registered in primary level control circuit 188. These control signals include the byte selection bits, fetch and store designating signals and a cancel request signal. This latter signal can be used to cancel the request at any time prior to actual accessing of the variable store unit.

The control signals in primary level control circuit 188 are stored, processed, retimed and passed on to memory initiate control circuit 189. Circuit 189 generates the actual control signals which initiate a memory cycle in variable store unit 190. In addition, signals from primary level control circuit 188 and memory initiate control circuit 189 are applied to request acknowledge circuit 191 which generates a signal on line 202 acknowledging the servicing of the corresponding request. The requesting unit uses this acknowledgement to terminate the request, since it has now been serviced.

The address and data information from registers 186 and 187 is passed on to variable store unit 190 simultaneously with the memory initiate signal from circuit 189. At the same time, the various other control signals are passed on to secondary level control circuit 192. These control signals in circuit 192, together with control outputs from variable store unit 190, are applied to address parity error circuit 193. Circuit 193 generates and passes on to the appropriate requesting unit an indication of an address parity error in the request just previously acknowledged. The control signals from secondary control circuit 192 are passed on to tertiary level control circuit 194. Since the variable store unit 190 is arranged to access and deliver half-word bytes, control circuit 194 is used to direct byte control circuit 195 so as to handle the half-word bytes in the proper manner. Since a full-word from variable store unit 190 is delivered to control circuit 195 in the form of a sequence of two half-word bytes, byte control circuits 195 are controlled in such a fashion as to reassemble the data bytes into the full data word.

Data parity errors detected by variable store unit 190 are reported from tertiary level control circuit 194 to data parity error circuit 196 and, in turn, are reported to the unit requesting the data fetch or data store. Control signals from tertiary level control circuit 194 are also passed on to quandrary level control circuit 197 which controls a data distributor 198 so as to pass the output data on to the appropriate requesting unit at a time the requesting unit is prepared to receive that data.

Error and status reporting circuit 199 is provided to detect and store indications of internal errors occurring in any of the other circuits of the variable store interface switching unit. Circuit 199 prepares and delivers status reports of the operating condition of the entire interface switching unit to the status unit, illustrated as block 60 in FIG. 3.

The control circuitry of the interface switching unit of FIG. 9 is divided into four levels (primary, secondary, tertiary and quadrary) to separate the timing and control required at each stage of servicing a request. Moreover, this separation of the control allows the overlapping of successive requests, permitting the processing of each request prior to the completion of the processing of the previous request.

In accordance with the present invention, the priority circuits 180 are arranged to selectively lock out any particular one or ones of the requesting units. This is accomplished by lockout signals on leads 200 applied to priority circuits 180. These lockout signals inhibit the servicing of the corresponding requests while permitting the servicing of all other requests. In this way, communication between this particular variable store unit and any requesting unit is terminated. Similar lockouts are, of course, provided for locking out any of the other units of the data processing system by selectively disabling such communication in the appropriate interface switching units. The details of this lockout control will be taken up hereinafter.

Figure 10:
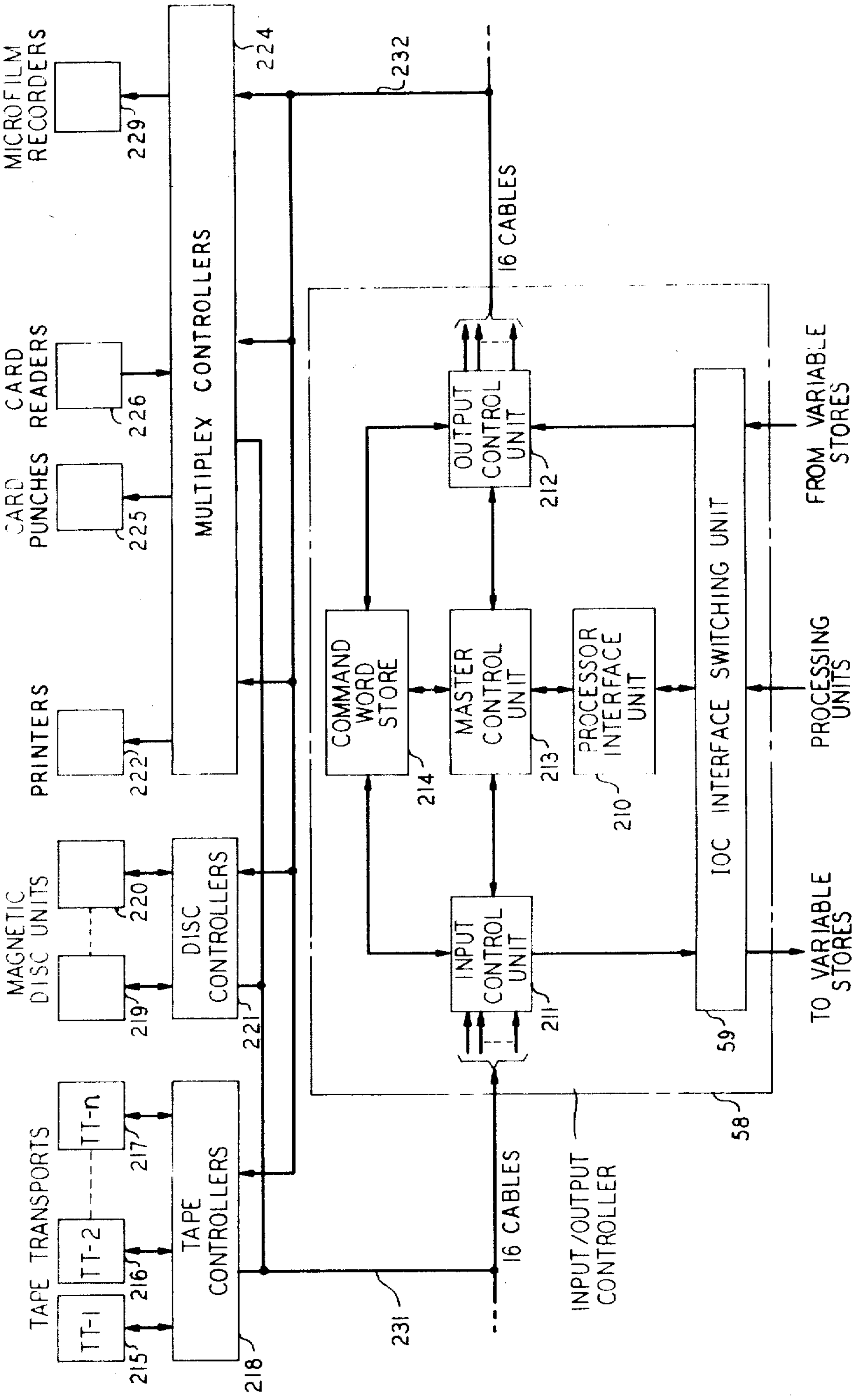
FIG. 10 is a more detailed block diagram of the input-output controller shown in FIG. 3.

In FIG. 10 there is shown a more detailed block diagram of the input-output controller shown as block 58 in FIG. 3 and the recording subsystem shown as block 16 in FIG. 1. The input-output controller 58 comprises input-output controller interface switching unit 59, a processor interface unit 210, an input control unit 211, an output control unit 212, a master control unit 213 and a command word store 214. Before proceeding to a detailed description of the operation of these units, a general overview of the functions of the input-output controller will be given.

The input-output controller (IOC) 58 directs the instruction flow from the processing units to the peripheral devices making up the recording subsystem. In FIG. 10, the peripheral devices are represented by the tape transport units 215, 216 and 217, under the control of the tape controllers 218; the magnetic disc units 219 through 220, controlled by the disc controllers 221; the printers 222, the card punch units 225, the card readers 226, and the microfilm recorders 229, all under the control of the multiplex controllers 224. All of these peripheral devices are well known to those of ordinary skill in the art.

The IOC 58 directs the instruction flow from the processing units to these peripheral devices, thus allowing the processing units to exert control over the peripheral devices, and also directs data flow between the variable store units and the peripheral devices. In the performance of this function, IOC unit 58 accepts and executes commands from the processing units or from any of the peripheral devices to initiate input and output functions. Furthermore, the IOC unit 58 can direct the peripheral devices to perform input and output functions independent of the processing units.

The processing units are constructed so as to view the IOC unit 58 as a portion of the variable store and thereby render the IOC unit 58 completely independent of any particular processor except during that instant of time for which it is addressed by a particular processing unit. Commands are transferred to IOC unit 58 in the same fashion that store operations are transferred to variable store units from the processing unit. A processor store request to IOC unit 58 causes the IOC to accept a command word form the processing unit.

Under the control of command words from the processing unit, IOC 58 is able to retrieve, from the variable store units, detailed sequences of commands necessary to implement all of the input-output operations. In this way, following a single command from a processing unit, the input-output controller is able to operate completely independently from all of the processing units and to complete relatively large input and output functions with no further assistance from the processing units.

Returning to FIG. 10, the master control unit 213 maintains control over the entire IOC unit 58 and performs all of the bookkeeping functions required for IOC operation. It executes all of the control and monitoring commands except a few direct commands issued by the processing unit. Master control unit 213 initiates data transfer operations in both the input control unit 211 and the output control unit 212, terminates these operations and processes all internal IOC errors. Since there are no data parts between master control unit 213 and units outside of IOC 58, the master control unit 213 uses input control unit 211 when it is necessary to write a word into variable store and uses output control unit 212 when it is necessary to fetch a word from variable store. These same units are used to transmit and accept command words to and from the peripheral devices.

Processor interface unit 210 interfaces directly with the processing units. It therefore contains all of the processor interrupt circuits and executes commands received from the processing units.

Command word store 214 is a small, temporary storage facility having one location for each of the input cables 231 and each of the output cables 232. These locations are used by the master control unit 213 for temporary storage of data or order transfer commands for the associated channel.

Output control unit 212 controls the transfer of binary words from the variable store units to the peripheral devices. It is an asynchronous unit which, upon request from a peripheral device or from the master control unit 213, transfers the desired word or words from the variable store unit to the requesting unit. The necessary control and address information for such transfers is obtained from the associated storage location in command word store 214. Indeed, the placement of the appropriate command word in the associated location of command word store 214 is a signal to output control unit 212 to respond to the request from the associated peripheral devices. When the last data or order word is transferred to the peripheral device, a termination notice is sent by output control unit 212 to master control unit 213. Multiword transfers are handled by decrementing a word count field in the transfer command word stored in command word store 214.

The input control unit 211 is very similar to output control unit 212 except that it controls the transfer of binary data words from the peripheral devices to the variable store. It is likewise under control of command words stored in command word store 214.

Each peripheral device controller has an input and an output cable used to transfer binary information to and from the associated peripheral devices. An input-output cable pair, together with the associated control wires, is called an I/O channel and thus 16 channels are provided by the arrangement of FIG. 10. Each channel has an input termination and an output termination each of which is called a logical port, these ports being identified as port 0 and port 1. The 32 ports have been numbered consecutively from 0 to 31 to permit port-oriented instruction formats.

There are three different types of binary words that can be transferred between IOC 58 and the peripheral devices. These are (1) command words containing control information for the master control unit 213; (2) order words intended as control information for the peripheral devices and (3) data words to be sent either to the variable store units or to the peripheral devices. The command words are transferred over the input cables, the order words over the output cables and the data words over both cables. The control wires are used to control these transfers.

The transfer of one or more order words and one or more data words is called an Order Transfer Job or a Data Transfer Job, respectively. The number of words to be transferred in one job is contained in a command word corresponding to that job. The input control unit 211 handles input data transfer jobs, while output control unit 212 handles output data transfer jobs and order transfer jobs. All of these jobs are initiated by the master control unit 213 but, once initiated, are controlled by the contents of command word store 214. When the control units 211 and 212 complete the job, a termination signal is sent to master control unit 213 to permit the initiation of the next sequence of operations.

The master control unit 213 includes two 64-bit history registers which contain information on the status of all the ports at all times. They are defined as history register 1 and history register 2. History register 1 contains the information on the availability of ports 0 through 19, while history register 2 contains the information on the availability of ports 20 to 31. The status of each port is represented by a three-bit code which is interpreted as follows:

| Code | Meaning |
|---|---|
| 000 | Port idle but not inhibited |
| 001 | Port inhibited |
| 010 | Order transfer in progress |
| 011 | Port inhibited during order transfer |
| 100 | Data transfer in progress |
| 101 | Port inhibited during data transfer |

Other status indications are possible with the remaining codes of the three-bit set.

A portion of history register 2 (bits 39 through 46) is called the Base Address Register and contains an eight-bit base address. The base address identifies the first location of a 2,048-word block in the variable store units. Since detailed sequences of command words are stored in the variable store unit, this base address provides a reference to the appropriate sector of the variable store units for such sequences. The base address is used in the manner to be hereinafter described.

All words are transferred in an asynchronous manner through the use of a request pulse and an acknowledge pulse for each transmission of a word. Requests are sent by the unit desiring action and acknowledgments are returned to the requestor to indicate that the action has been performed. If, for example, a peripheral device has obtained data which it wishes to transfer to the variable store unit, the peripheral device sends a request pulse to the IOC unit 58 and places the data word on the appropriate cable to input control unit 211. Input control unit 211 temporarily stores the word in a buffer register and sends an acknowledge pulse back to the peripheral device indicating that the word has been accepted. The peripheral device can then remove the binary word from the data cable and proceed to the next word by sending a request.

The input control unit 211 decodes the address portion of the received data and generates a write request for the appropriate variable store unit. The remainder of the variable store address, along with the data word, are then placed on lines to interface switching unit 59. The variable store unit acts on the request, accepts the data and address information and returns an acknowledge pulse to input control 211. Unit 211 can then remove the data and address words and proceed on the next task.

When a peripheral device requests data from the variable store units, the address portion of the command word is decoded by output control unit 212 to generate a fetch request for the appropriate variable store unit. The variable store address is placed on the output lines to interface switching unit 59 and when the request is fulfilled, an acknowledgment is returned to output control unit 212. The fetched word is placed in buffer storage in output control unit 212 and then is gated to the appropriate peripheral device on the proper output cable, along with the acknowledgment indicating that the original request has been fulfilled.

Although control units 211 and 212 can operate on only one request at a time, these requests can be sent by any of the peripheral devices at any time. These requests are queued in the control units until they can be filled.

In order to understand the detailed program flow, it is first necessary to note the organization of a portion of the variable store units. The 79-word block of variable store locations, referred to by the base address register and called the deposit box, is set aside for use by IOC 58. The deposit box is analogous to a traffic policeman directing traffic and serves to switch and direct program initiation and flow.

The various I/O job and status lists which must be referred to as the IOC proceeds with its jobs are organized as a chained list of words called a link chain. These link chains are reached by locator words termed head pointers. The head pointers are stored in the deposit box. The head pointer contains two addresses; a link pointer address which locates the next word in a link chain and a command pointer address which locates the first command word of an I/O job to be executed. Only the head pointers (or locator words) need be stored in the deposit box; the link chains and I/O job programs may be located anywhere in variable store. The master control unit 213 includes a command counter for sequencing through the I/O routines referred to by the head pointers.

Before proceeding to a detailed explanation of the instruction repertoire of the input-output controller, it is necessary to point out some differences between processor and IOC instructions. The processor considers all IOC instructions as data. They are located physically in variable store and not in program store where the processor instructions are located. This permits dynamic modification of IOC programs during program execution.

The instruction repertoire is divided into direct commands, indirect commands, and peripheral commands. Direct commands are used to initiate input-output jobs in the course of, but independent of, the operating system. These commands are input to the IOC via the processor interface unit 210.

The indirect commands are the commands used by the IOC to implement the transfer of data or to control the IOC program sequence to accomplish a specific task. They are all stored in variable store prior to their use during program execution. As noted above, they form the contents of linked sequences for detailed task accomplishment.

The peripheral commands are initiated by the peripheral devices and sent to the IOC to initiate a job. The head pointer to the linked chains is a command word used by the IOC and the processors as a bookkeeping operator. The head pointer contains the information necessary for loading and taking words from variable store I/O job and status lists.

The following is a listing of the command words recognized by the input-output controller:

Direct Commands (From Processor Unit; 34-bit format)

| | | | |
|---|---|---|---|
| 1. | CL10 | | CLEAR IOC. Set the IOC to the initialized state, inhibiting all ports and clearing all intermediate registers. This command isolates the IOC from all peripherals in preparation for the receipt of the LBA command. |
| 2. | LBA | A | LOAD BASE ADDRESS. Loads a variable store address A into the base address register of the master control unit representing the first location of a deposit box. |
| 3. | CLPT | P | CLEAR PORT. Initialize the IOC port P. |
| 4. | CLCH | P | CLEAR CHANNEL. Initializes the channel P. (both ports). |
| 5. | ENPT | P | ENABLE PORT. Clears the inhibit from port P and allows it to resume execution of commands. |
| 6. | ENCH | P | ENABLE CHANNEL. Clears the inhibit from channel P and allows it to resume execution of commands. |

| | | | |
|---|---|---|---|
| 7. | INCH | P | INHIBIT CHANNEL. Inhibit the channel P from executing commands. |
| 8. | INPT | P | INHIBIT PORT. Inhibit the port P from executing commands (except STE, STEI, SEIO, and PUI). |
| 9. | IIO | P | INITIATE I/O OPERATION. Set the port P initiation flag. |
| 10. | SSA | P,A | SNAPSHOT ON ADDRESS. Compare variable store address associated with port P with address A. When they match, gate the next data word at port P to the snapshot data register. |
| 11. | SSW | P, BE, D, WC | SNAPSHOT ON WORD COUNT COMMAND. Count items D on port P until count BE is reached. Then count the word transfers on port P to count WC and gate next word at port P into snapshot data register. |

The following commands are recognized by the input-output controller, but come from variable store as data, rather than from the processor unit.

Indirect Commands (64-bit format)

| | | | |
|---|---|---|---|
| 12. | FAST | A1, A2, E | FETCH AND STORE. Fetch the contents of variable store location A2 and store in Variable Store Location A1. If E is a "1," obtain the next command from next variable store location following this command. If E is "0," terminate the job. |
| 13. | ODT | Δ, W, E, L, A | OUTPUT DATA TRANSFER. Transfer W+1 words from A in variable store to the peripheral device associated with this port. Increment A by Δ and decrement W by one after each transfer until W=0. If E=1, get next command from L; if E=0, terminate. If L=0, get the next command from the next variable store location. |
| 14. | ORT | Δ, W,E, L, A | OUTPUT ORDER TRANSFER. Same as ODT except that order words rather than data words are transferred to the peripheral device. |
| 15. | IDT | Δ, W,E, L,A | INPUT DATA TRANSFER. Inverse of ODT, for transferring data from the peripheral device to the variable store. |
| 16. | LO | E,L,A | LOCK. Biased fetch from variable store at A. If bits 0 and 1 are "1," store location from which LO was fetched in the deposit box; if bits 0 and 1 are not "11," obtain the next command from L. If L=0, use the present location +2. |
| 17. | ULO | E,L,A | UNLOCK. Fetch the word from variable store at A, reset bits 0 and 1 to "0" and restore to A. If E=1, get next command from L; if E=0, terminate. If L=0, get the next command from the next variable store location. |
| 18. | SBO | F,E,A | SET BIT TO LOGIC 0. Fetch word A, set bit F to "0" and restore to A. If E=1, obtain next command from the next variable store location; if E=0, terminate. |
| 19. | SB1 | F,E,A | SET BIT TO LOGIC 1. Fetch word A, set bit F to "1" and restore to A. If E=1, obtain next command from the next variable store location; if E=0, terminate. |
| 20. | RA | E,L,A | RECORD ADDRESS. Store the address portion of the data transfer command (ODT, ODTS, ORT, IDT, IDTS) associated with this port in A. If E=1, obtain next command from L; if E=0, terminate. If L=0, sequence to next variable store location. |
| 21. | TRA | E,A | TRANSFER. If E=1, obtain next command from A; if E=0, terminate. |
| 22. | TSK | F,M,E, J,A | TEST, SKIP. Fetch word A from variable store and OR test F half of word with mask M. If test produces all "1's," take the next command from the location of present command +J; if not, take the next command from the location following the present command (E=1) or terminate (E=0). |
| 23. | SBTS | F,M,E, J,A | SET BIT, TEST, SKIP. Fetch word A, set bit F to "1" and restore to A. Before restoring, OR test set bit half of word with M. If test produces all "1's," take the next command from present location +J; if not, take the next command from present location +2 (E=1) or terminate (E=0). |
| 24. | TST1 | (Pattern) | TEST 1. Store this command in the command word store as specified by this port. Set port busy flag. |
| 25. | TST2 | (Pattern) | TEST 2. Same as TEST 1. |
| 26. | FASM | A1, A2, E | FETCH AND STORE MODIFIED. Fetch variable store words A and A2, substitute bits 12-31 of A1 for bits 12-31 of A2, and restore results to A2. If E= 1, obtain next command from the location following the location of this command; if E=0, terminate. |
| 27. | FIX | U,E, L,A | FETCH AND STORE INDEX. Fetch the contents of A and store in control register 2. Add U and restore to A. If E=1, obtain next command from L; if E=0, terminate. If L=0, sequence to next variable store location. |
| 28. | TSSB | F,M,E, J,A | TEST, SKIP, SET BIT. Fetch contents of A, OR test F half of word with M, set F bit to "1" and restore to A. If test produces all "1's," obtain next command from variable store at the location of the present command +J; if not, obtain next command from the next following variable store location (E=1) or terminate (E=0). |
| 29. | IDTS | Δ, W,E, L,A | INPUT DATA TRANSFER SNAPSHOT. Same as IDT. Reset snapshot register if it contains SSW with bit 17 set. |
| 30. | ODTS | Δ,W,E, L,A | OUTPUT DATA TRANSFER SNAPSHOT. Same as ODT. Reset snapshot register if it contains SSW with bit 17 set. |
| 31. | RCW | E,L,A | RECORD COMMAND WORD. Store the command word associated with this port in A. If E=1, get next command from L; if E=0, terminate. If L=0, increment to next variable store location. |
| 32. | RC2 | E,A | RECORD C2 COMMAND. Store the contents of control register 2 in A. If E=1, get next command by incrementing the variable store address counter; if E=0, terminate. |
| 33. | IIC | E,A1, A2 | INSERT INTO CHAIN COMMAND. Biased fetch (from A2) a head pointer. If lockout bits =11, store location of this command into the deposit box. If the lockout bit 11, fetch A2 link word and restore to A1, storing IIC in A2. If E=1, increment variable store address counter; if E=0, terminate. |
| 34. | BOPE | A1,A2 | BRANCH ON PERIPHERAL END. If PRIO flag is set, get next command from A1; if SEIO flag is set, get next command from A2. If neither is set, get next command from the next variable store location. |
| 35. | RBOPE | A1,A2 | RECORD C2, BRANCH ON PERIPHERAL COMMAND Store the contents of control register 2 at A2. If PRIO or SRIO flag is set, get next command from A1; if neither, use the next variable store location. |
| 36. | LSBOU | 0,F,E, | |

| | | | |
|---|---|---|---|
| | | A1,A2 | LOCK, SET BIT TO LOGIC 0, UNLOCK. Biased fetch A2. If bits 1 and 2 are "11," load address of this command in the Deposit Box; If "11", and 0 = 1, set bit F to "0" and restore. If 0=a, fetch A1, set bit F to "0" and restore. If E=1, obtain next command from the next location; if E=0, terminate. |
| 37. | LSB1U | 0,F,E, A1, A2 | LOCK, SET BIT TO LOGIC 1, UNLOCK. Same as LSBOU except to 'set'F bit |
| 38. | LSBTSU | 0,F, M,J,A | LOCK, SET BIT, TEST, SKIP, UNLOCK. Biased fetch of A. If L=11, store the location of this command in the Deposit Box. If L 11, OR F half of word with M and set bit F to "1." If O=0, restore, with L bits cleared, to A1; if O=1, set L bits to "11" and restore. If OR produces all ones, get next command from present location +J. If not and E=1, go to next location. If E=0, terminate. |
| 39. | UHR1 | E,A | UNLOAD HISTORY REGISTER 1. Store the contents of History Register 1 in variable store at A. If E=1, get next command; if E=0, terminate. |
| 40. | UHR2 | E,A | UNLOAD HISTORY REGISTER 2. Store the contents of History Register 2 in variable store at A. If E = 1, get next command in variable store; if E=0, terminate. |
| 41. | ULH | E,A | UNLOAD LOCK HISTORY REGISTER. Store the contents of the Lock History Register at A. If E=1, get next command from next variable store location; if E=0, terminate. |
| 42. | USS | E,P,A | UNLOAD SPECIFIED COMMAND WORD STORE LOCATION. Store the contents of the command word store specified by P in variable store at A. If E=1, get the next command from the next variable store location; if E=0, terminate. |

The following commands are recognized by the Input-Output Controller and come from any one of the peripheral devices.

Peripheral Commands (32-bit format)

| | | | |
|---|---|---|---|
| 43. | BBT | I,U | BEGIN BLOCK TRANSFER. Fetch the contents of Variable Store at BAR + (requesting channel number) + 80; using fetched word as address, fetch the contents, Z, of that word plus U, executing the command at Z on port I. (U must be even). BAR is the Base Address Register, holding the address of the Deposit Box. |
| 44 | EBT | I,U | END BLOCK TRANSFER. Fetch the command in Command Word Store at (requesting channel) +I. Fetch the contents, Z, of the VS location specified by BAR + (requesting channel number) + 80. Store the fetched command word in Z+U. |
| 45. | DEN | I,U | DIRECT ENTRY. Same as BBT, except it cannot be used to initiate any sequence including ODT, ODTB, IDT, IDTB, ORT or LO. |
| 46. | EIO | I | END I/O OPERATION. Terminate the operation on (requesting port) + I and set the PEIO flag. Fetch command from Command Word Store at requesting port; if E=1, obtain next command from L. |
| 47. | PIIO | I,U | PERIPHERAL INITIATE I/O. Fetch the contents of variable store at BAR + (requesting channel) + 64. Fetch the Head Pointer using the fetched address + U. Continue as IIO. |
| 48 | STEI | I,N,W | STATUS ENTRY INDEXED. Fetch the contents of variable store at BAR +(requesting channel) + 128. Using this as an address and adding N, fetch the Status Entry Head Pointer, execute and up date. |
| 49. | SEIO | I,N,W | STATUS ENTRY AND END I/O OPERATION. Fetch the contents of variable store at BAR + (requesting channel) + 128. Using the fetched ad;ress +N, fetch a Status Entry Head Pointer, execute and up date. |
| 50. | PUI | N,H | PROCESSOR UNIT INTERRUPT. Fetch the contents Z of Variable Store at BAR + 154. Fetch Interrupt Test Head Pointer at Z in Variable Store and execute. Interrupt Processor N (if N=0, interrupt first available processor). |

Figure 11:
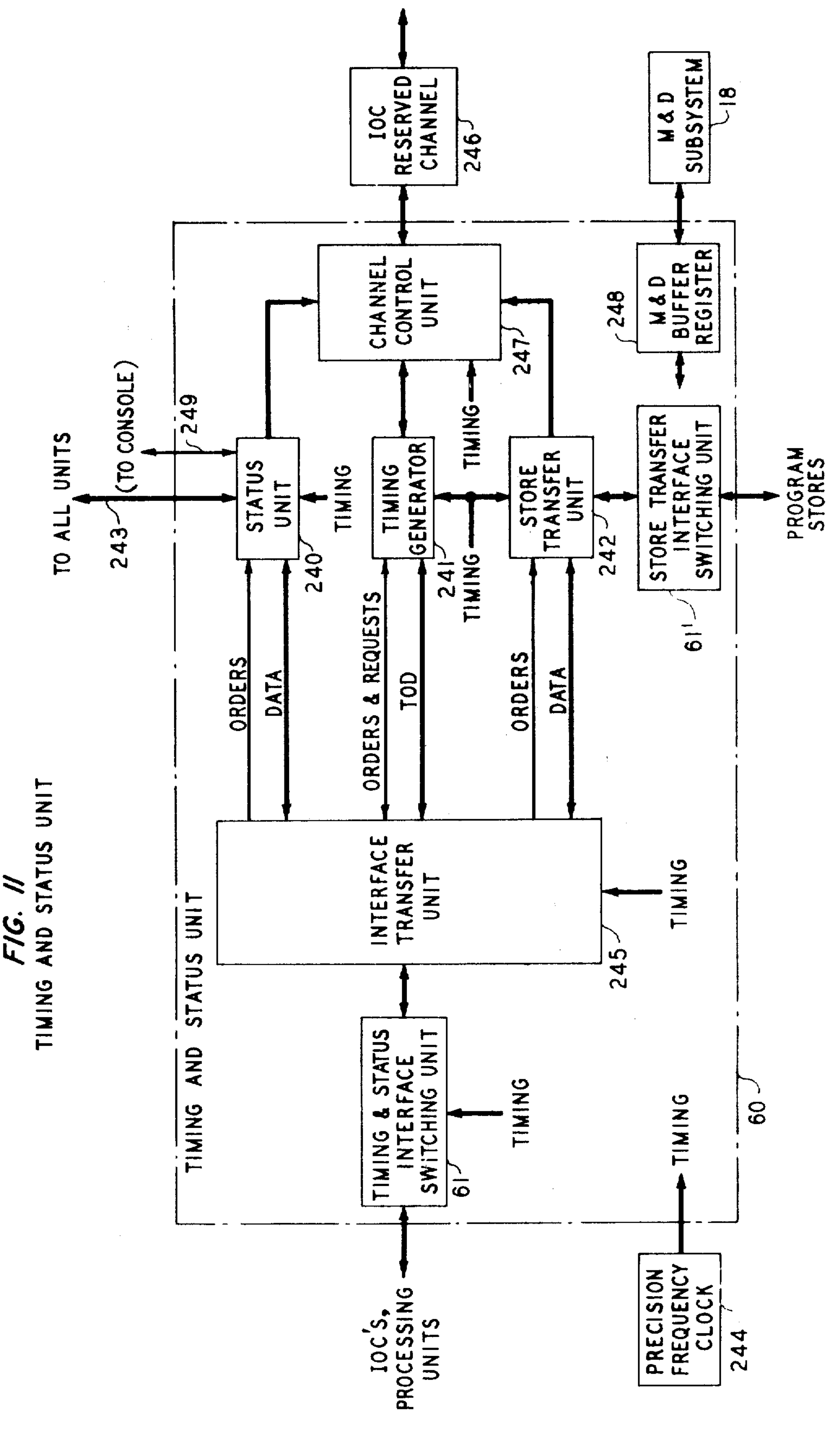
FIG. 11 is a more detailed block diagram of the timing and status unit shown in FIG. 3.

In FIG. 11 there is shown a more detailed block diagram of the timing and status unit 60 shown in block form in FIG. 3. The timing and status unit 60 includes three major subunits, the transfer unit 240, the Timing generator 241, and the store transfer unit 242. Each of these units performs a particular function for the overall data processing system. The status unit 240 for example, forms the interface with a status console which is used by operating personnel to monitor the operation of the system, to extract data from the system and to insert data into the system for the purposes of maintenance and control. In addition, the status unit 240 collects, stores and dispenses a considerable amount of basic status information concerning the operating system. It is interconnected with all of the other units of the data processing system by status lines 243 which permit the collection of status information independent of all of the normal data paths in the operating system.

The timing generator 241 interfaces between the operating system and the precision frequency clock 244. Clock 244 provides the basic timing for the entire data processing system. The timing generator 241 originates command words to the input-output controller to cause that controller to perform specific sequences of operations at specific times. The timing generator 241 also provides real time pulses to the peripheral devices of FIG. 10 to control the timing of peripheral operations. In addition, the timing generator 241 can provide the calendar clock time-of-day (TOD) to the processing units or to the input-output controllers upon request.

The precision frequency clock 244 provides a 5 mHz. timing signal to the timing generator 241 which includes a 48-bit calendar clock TOD counter. The least significant bit of this TOD counter, therefore, represents 0.2 microseconds and the full count of the clock is equal to approximately one year. In addition, the precision frequency clock 244 provides a 42-bit binary-coded-decimal (BCD) word to the timing generator where the least significant bit is equal to 1 millisecond. A processing unit can request this BCD TOD in order to synchronize the precision frequency clock 244 and the Timing Generator 241.

The store transfer unit 242 has the single purpose of altering the contents of the program stores 52 and 53 of FIG. 3. It is the only unit which has this capability and thus all program store modifications must be accomplished through store transfer unit 242. The store transfer unit 242 receives order and data words and distributes program store modifications by way of the store transfer interface switching unit 61' to the appropriate program store units. The store transfer unit 242 also monitors errors in the received information and reports these errors as status information to the status unit 240.

The three units described above share communication paths into and out of the timing status unit 60. One of these paths is by way of the timing and status interface switching unit 61. Data is transferred into or away from the timing and status interface switching unit 61 in much the same fashion that it is transferred into and out of the other major units, such as the Variable Store unit. In order to permit standardization of the interface switching units, an interface transfer unit 245 is provided to multiplex the access of the status unit 240, the timing generator 241 and the store transfer unit 242 into the single interface switching unit 61.

In order to provide a means of interrupting the operating system, the three functional units 240, 241 and 242 also share a single channel 246 of the input-output controller. This channel sharing is under the control of a channel control unit 247.

The maintenance and diagnostic subsystem 18 also interfaces with the timing and status unit 60 by way of the M & D buffer register 248. In this way, the Maintenance and diagnostic subsystem 18 can receive reports from and control the operation of the entire timing and status unit 60.

The status unit 240 has four major interfaces. These interfaces consist of the manual interface between the status control console and the status unit by way of leads 249, the hardwired interface between the status unit 240 and all of the other units of the central logic and control by way of leads 243, and the two software interfaces by way of the interface switching unit 61 and the IOC channel 246. It is the purpose of the status unit to collect system status information, to inform the operating programs of the system's status, and to execute those functions initiated by the software and distributed by the hardwired interface. One of these hardwired outputs comprises the lockout signals that are able to inhibit data transfers at the interface switching unit, and thus permit system partitioning, segmenting and isolation. The status unit 240 utilizes the IOC Channel 246 for interrupt purposes whenever a significant change occurs in the system status.

Figure 12:
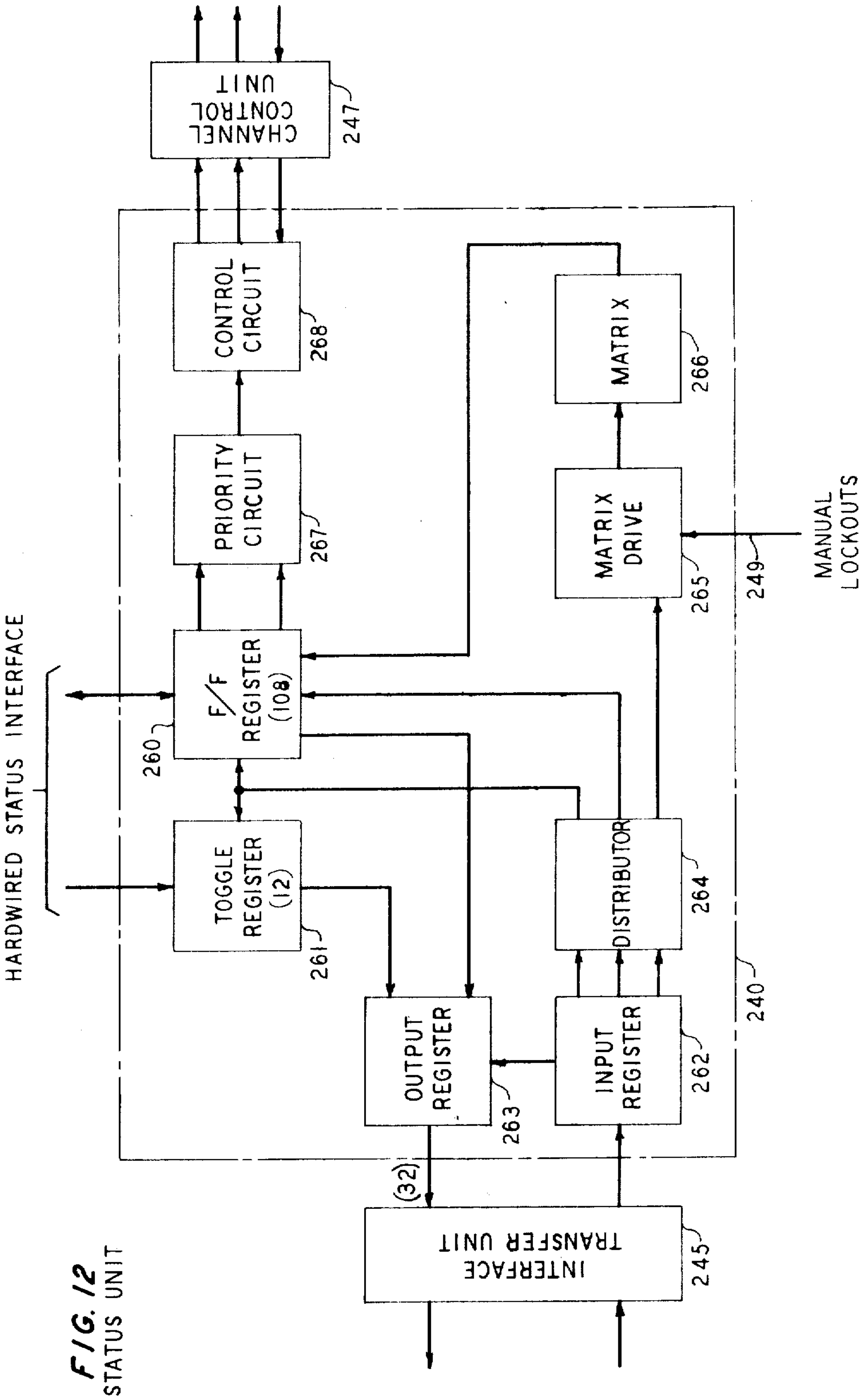
FIG. 12 is a yet more detailed block diagram of the status portion of the timing and status unit of FIG. 11.

A more detailed block diagram of the status unit 240 can be found in FIG. 12. As illustrated in FIG. 12, the status unit includes a plurality of status registers divided into two basic types referred to as the flip-flop registers 260 and the toggle registers 261. There are provided 108 of the flip-flop registers 260 and 12 of the toggle registers 261, thus making 120 registers altogether. Each status register interfaces exclusively with a particular module of the data processing system.

Communication with the status unit 240 by way of interface transfer unit 245 is by way of an input register 262 for receiving information into the status unit 240 and an output register 263 for transferring information from the status unit. Input register 262 distributes data and order words by way of distributor 264 to the flip-flop register 260, the toggle registers 261 and matrix drive circuit 265. In addition to being controlled by program-derived signals from distributor 264, matrix drive, 265 is also under the control of manually derived signals from the status control console by way of leads 249. The matrix drive circuit 265, together with the matrix circuit 266, provide the basic lockout system for the data processing circuits. In general, a crosspoint-type of matrix is provided whereby the coincidence of lockout requests from the various units are used to generate lockout signals which control the actual interruption of data transfers between these units. These lockout signals are distributed by way of flip-flop registers 260 to the various interface switching units at which the lockout is effectuated.

The status information in flip-flop register 260 is continually monitored to ascertain status conditions in the central logic and control. These status indications are ordered, as to priority, in priority circuit 267, and appropriate correctional or interrupt operations initiated by signals generated in control circuit 268 and transferred to the input-output controller by way of channel control unit 247.

The 120 status words in registers 261 and 262 are associated with various hardware units of the data processing system on a one-for-one basis in most cases. Thus 16 status words are available and correspond to the 16 variable store units; 32 status words are available and correspond to the 32 program store units; and 10 status words are available to correspond to the 10 processing units. Some of the units, such as the timing and status units, require five different words to represent all of the status information with respect to that unit. Status words are also available to represent the status of the various peripheral units illustrated in FIG. 10 as well as various units external to the central logic and control 15 of FIG. 1.

Each bit of each status word represents a particular status condition with regard to the corresponding hardware unit. These words are 24 bits in length. For the purpose of illustration, the following are the designations of the status bits for three types of status words.

Variable Store Status Word

| Bit No. | |
|---|---|
| 0 | Test Enable |
| 1 | Data Parity Error |
| 2 | Address Parity Error |
| 3 | GSB T/O Error |
| 4 | PU 1 Lockout |
| 5 | PU 2 Lockout |
| 6 | PU 3 Lockout |
| 7 | PU 4 Lockout |
| 8 | PU 5 Lockout |
| 9 | PU 6 Lockout |
| 10 | PU 7 Lockout |
| 11 | PU 8 Lockout |
| 12 | PU 9 Lockout |
| 13 | PU 10 Lockout |
| 14 | IOC 1 Lockout |
| 15 | IOC 2 Lockout |
| 16 | IOC 3 Lockout |
| 17 | IOC 4 Lockout |
| 18 | Power ON |
| 19 | Interlock |
| 20 | Power Marginal |
| 21 | Spare |
| 22 | Spare |
| 23 | Spare |

Program Store Status Word

| Bit No. | |
|---|---|
| 0 | Test Enable |
| 1 | Data Parity Error |
| 2 | Address Parity Error |
| 3 | Resume T/O Error |
| 4 | GSB T/O Error |
| 5 | PU 1 Lockout |
| 6 | PU 2 Lockout |
| 7 | PU 3 Lockout |
| 8 | PU 4 Lockout |
| 9 | PU 5 Lockout |
| 10 | PU 6 Lockout |
| 11 | PU 7 Lockout |
| 12 | PU 8 Lockout |
| 13 | PU 9 Lockout |
| 14 | PU 10 Lockout |
| 15 | STU 1 Lockout |
| 16 | STU 2 Lockout |
| 17 | DUP Mode PS O & 16 |
| 18 | Power ON |
| 19 | Interlock |
| 20 | Power Marginal |
| 21 | Spare |
| 22 | Spare |
| 23 | Spare |

IOC Status Word

| Bit No. | |
|---|---|
| 0 | Test Enable |
| 1 | PIU Fault |
| 2 | Error While Servicing Error |
| 3 | Error Test Lockout |
| 4 | IOC 2 Lockout |
| 5 | IOC 3 Lockout |
| 6 | IOC 4 Lockout |
| 7 | PU 1 Lockout |
| 8 | PU 2 Lockout |
| 9 | PU 3 Lockout |
| 10 | PU 4 Lockout |
| 11 | PU 5 Lockout |
| 12 | PU 6 Lockout |
| 13 | PU 7 Lockout |
| 14 | PU 8 Lockout |
| 15 | PU 9 Lockout |
| 16 | PU 10 Lockout |
| 17 | IOC 1 Lockout |
| 18 | Power ON |
| 19 | Interlock |
| 20 | Power Marginal |
| 21 | Spare |
| 22 | Spare |
| 23 | Spare |

Figure 13:
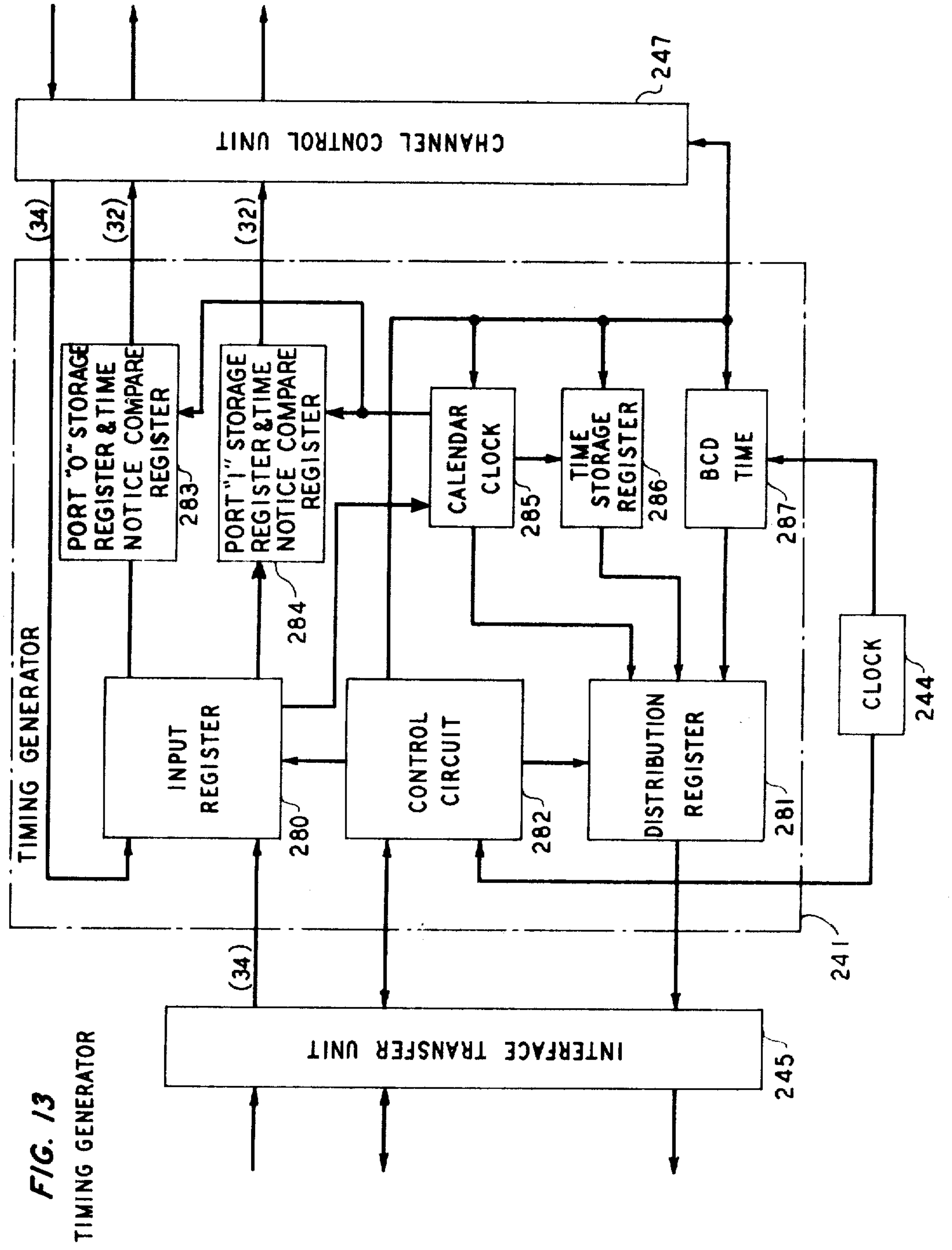
FIG. 13 is a more detailed block diagram of the timing generator portion of the timing and status unit of FIG. 11.

In FIG. 13 there is shown a more detailed block diagram of the timing generator 241 (FIG. 11) including an input register 280 and a distribution register 281 for receiving and distributing data to and from the timing generator 241. Order words are received and distributed by a control circuit 282 by way of interface transfer unit 245. Control circuit 282 controls the movement of data into and from registers 280 and 281. Data in input register 280, for example, can be transferred to a port "0" storage register 283 or received from port "1" storage register 284 to permit exchange of data with the input-output controller by way of the channel control unit 247.

The control circuit 282 also controls the calendar time-of-day clock 285, the time storage register 286, and the BCD time register 287. In response to an appropriate order word, control circuit 282 causes the contents of calendar clock 285 to be read into time storage register 286 for transfer, by way of distribution register 281 and interface transfer unit 245, to a processing unit requesting time-of-day information. Similarly, in response to a request, control circuit 282 causes the BCD time-of-day from Clock 244 to be entered into BCD time register 287, thereafter to be transferred, by way of distribution register 281 and interface transfer unit 245, to a requesting processing unit.

Figure 14:
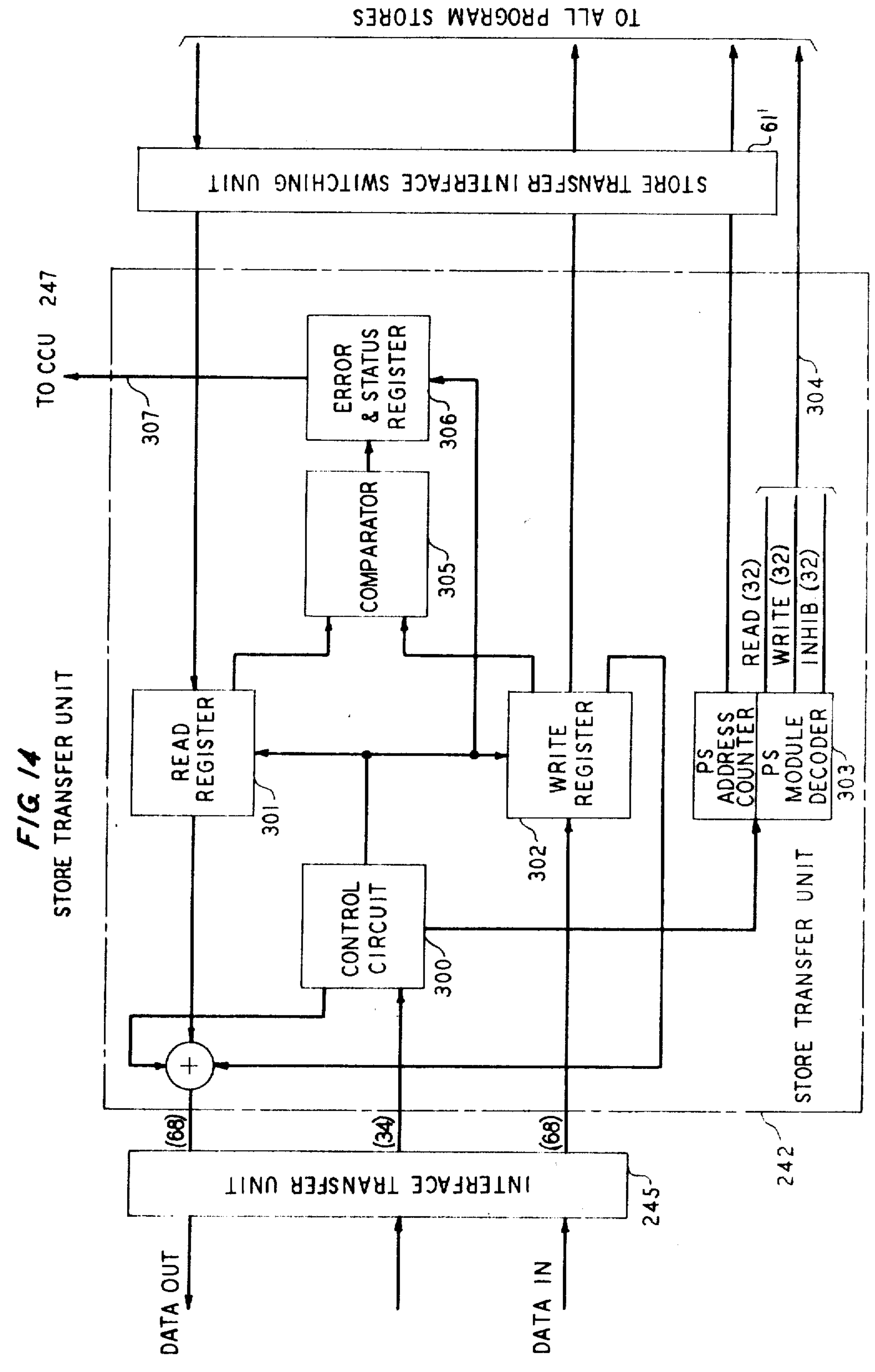
FIG. 14 is a more detailed block diagram of the store transfer portion of the timing and status unit of FIG. 11.

In FIG. 14 there is shown a more detailed block diagram of the store transfer unit 242 (FIG. 11) including a control circuit 300 which receives orders for execution by the store transfer unit. The store transfer unit receives program words from the program store units by way of interface switching unit 61' into read register 301. Similarly, program words to be stored in the program store units are entered into write register 302 and distributed to the program store units by way of interface switching unit 61'.

Control circuit 300 also controls a program store address counter and module decoder 303. Circuit 303 holds the identity of the particular program store module which is being written into or read from and decodes this identification to generate access signals on leads 304. These access signals include three types; read, write and inhibit. Unit 303 also includes a counter circuit for identifying the particular address within the identified program store module. This address register is in the form of a counter so that program store addresses may be accessed sequentially without receiving further directions from the outside of the store transfer unit.

A comparator circuit 305 is provided to compare the contents of read register 301 and write register 302. In this way, a program word just read from the program store module can be compared with the program word to be written into that same program store location. If a match does not occur, an error signal is transferred to error and status register 306 to indicate the discrepancy. This signal is transferred by way of leads 307 to the channel control unit 247 and then to the input-output controller for interrupt purposes.

In order to better understand the operation of the timing and status unit, including the operation of the timing generator, the status unit and the store transfer unit, the following order words are described in detail. These order words direct the execution of the particular operations by the respective units. They are divided into three sets, one set for each unit.

Timing Generator Orders

| | | | |
|---|---|---|---|
| 1. | MC | P | MASTER CLEAR. Clear all registers of the Timing Generator and flip-flops for port P, and inhibit order requests. |
| 2. | ETNC | P | ENABLE TIME NOTICE COMPARATOR. Clear the MC and DTNC inhibits, clear the late order counter and load a BBT request for port P to initiate the sending of orders to the timing generator from the input-output controller master control unit. |
| 3. | DTNC | P | DISABLE TIME NOTICE COMPARATOR. Inhibit new order requests for port P. (Normally, after the completion of each order, a BBT request is sent to the IOC to obtain new orders). The inhibit can be released only by ETNC. |
| 4. | SMO | P, (masks) | SET MASK ORDER. This order sets comparison masks for the indicated port P. These masks include a compare mask, a late order mask and a program repetition period (PRP) mask, one of each for each of ports 0 and 1. |
| 5. | GTN | P,TN, CWP | GENERATE TIME NOTICE. Compare the time notice (TN) with the calendar clock time-of-day (TOD) and, when equal, load a COMP request for port P into the priority list. When executed, the COMP causes the command word CWP to be sent to the IOC. |
| 6. | GTP | P,TN, DC | GENERATE TIME PULSE. Compare the time notice TN with the calendar clock time-of-day (TOD) and, when equal, send real time pulses to the peripheral devices specified by the distribution code DC. |
| 7. | GNP | P,TN, DC | GENERATE NOTICE AND PULSE. Compare the time notice TN with the calendar clock time-of-day (TOD) and, when equal, send real time pulses to the peripheral devices specified by DC, and load a COMP into the priority list to send CWP to the IOC. |
| 8. | LRR | RT | LOAD RESET REGISTER. Transfer the reset time RT to the counter resets register. In response to a later gating pulse, the calendar clock is reset to this value. |
| 9. | TTA | P,TW | TEST TURNAROUND. Transfer test word TW into the port P storage register and load a TTA request into the priority list. When executed, the TTA request sends a BBT to the IOC which, in turn, requests transfer of the test word TW. |

Status Unit Orders

| | | | |
|---|---|---|---|
| 10. | MC | | MASTER CLEAR. Clear all status unit control registers, inhibiting all hardwired status bit interfaces. This lock can be removed only by UHI. (Does not clear the status word registers). |
| 11. | RC | | REGISTER CLEAR. Clear all status word registers. |
| 12. | SAB | WA,BI | SET ADDRESSED BIT. Set the bits in the word at address WA as indicated by the bit indicators BI. |
| 13. | CAB | WA,BI | CLEAR ADDRESSED BIT. Clear the bits in the word at address WA as indicated by the bit indicators BI. |
| 14. | UHI | | UNLOCK HARDWIRED INTERFACE. Remove the locks imposed by MC or LWIO. |
| 15. | LWHI | WG,WI | LOCK WORD HARDWIRED INPUT. Place an inhibit on the hardwired inputs to the status words specified by the word group (WG) and word indicator (WI) fields, and remove all other input inhibits. Does not affect partition inhibits. |
| 16. | LWHO | WG,WI | LOCK WORD HARDWIRED OUTPUT. Place an inhibit on the hardwired outputs from the status words specified by the word group (WG) and word indicator (WI) field, and remove all other output inhibits. Does not affect partition inhibits. |
| 17. | LWIO | WG,WI | LOCK WORD INPUT-OUTPUT. Place inhibits on both the hardwired inputs and the hardwired outputs from the status words specified by WG and WI, clearing all other inhibits. |
| 18. | DAWR | WG,WI | DISABLE ADDRESSED WORD REQUEST. DISABLE the words specified by WG and WI from generating their respective command word interrupts. Can be removed only by EAWR. |
| 19. | EAWR | WG,WI | ENABLE ADDRESSED WORD REQUEST. Remove the enable from the words specified by WG and WI imposed by DAWR. |

| | | | |
|---|---|---|---|
| 20. | EPPC | | ENABLE PROGRAM PARTITION CONTROL. Impose all of the previously received program-controlled partitioning orders (SPT, SPC, CPC) on the system by locking the appropriate partitioning control leads. |
| 21. | DPPC | | DISABLE PROGRAM PARTITION CONTROL. Remove the partitioning imposed by EPPC (The pattern is preserved, however, for further use by another EPPC order). |
| 22. | SPD | A,B, BI | SET PARTITION DRIVE. Set the B one-half of the partition drive register A to the list pattern indicated by bit indicators BI. This order must be preceded by SPT, CPD or another SPD within specified time limits (partition time-out). |
| 23. | CPD | A,B, BI | CLEAR PARTITION DRIVE. Clear the B one-half of the partition drive registers A at the bit positions indicated by bit indicators BI. (Must appear before partition timeout). |
| 24. | SPT | | START PARTITION COUNTER. Start the partition timeout counter. |

Store Transfer Unit Orders

| | | | |
|---|---|---|---|
| 25. | MC | | MASTER CLEAR. Clear all data and control registers. |
| 26. | NOOP | | NO OPERATION. Reset the timeout counter with no other operation. |
| 27. | WRST | A | WRITE STORE. Write the program words appearing in the write register into the program store, beginning at location A and advancing the program store address counter (PSAC) for each write operation. |
| 28. | RDST | A | READ STORE. Read program words into the read register, beginning at program store location A, and advancing the program store address counter (PSAC) for each read operation. |
| 29. | RDWT | A | READ/WRITE. Fetch sequential program words into the read register, beginning at program store location A, forward these words to a processing unit for modification, and restore the modified words to the same program store locations via the write register, advancing the PSAC after each round trip. |
| 30. | WRTC | A | WRITE/COMPARE. Write the program words appearing in the write register into the program store, beginning at location A, fetch the word back to the read register and compare with the just stored word, advancing the PSAC after each comparison. Whenever the two do not compare, set an error word in the error and status register. |
| 31. | VSTR | A | VERIFY STORE. Read the program words from the program store, beginning at location A, and compare these words with incoming words from the processor unit or the IOC, advancing the PSAC after each comparison. Whenever the two do not compare, set an error word in the error and status register. |
| 32. | EOP | | END OPERATION. Terminate the task initiated by WRST, RDST, RDWT, WRTC or VSTR. |

The error indications from error and status register 306 (FIG. 14) can be summarized by the following list:

Each error is indicated by a different error word, each including a particular program store address.

1. Comparator Error. A compare error has occurred during the execution of WRTC or VSTR at the indicated program store address.

2. Data Parity Error at ITU. A parity error has been detected by the interface transfer unit (ITU) in data being transferred to or from the specified address.

3. Data Parity Error at PS. A parity error has been detected by the program store (PS) in an instruction being transferred to or from the specified address.

4. Address Parity Error. A parity error has been detected by the program store (PS) in this address.

5. Program Store Read Time Out. A specified time has elapsed since a read request has been sent to the program store at the specified address, and no acknowledgment has been received. Causes the PSAC to advance and an attempt is made to read the next word.

6. Program Store Write Time Out. A specified time has elapsed since a write request has been sent to the program store at the specified address, and no acknowledgment has been received. Causes the PSAC to advance and an attempt is made to write the next word.

Figure 15:
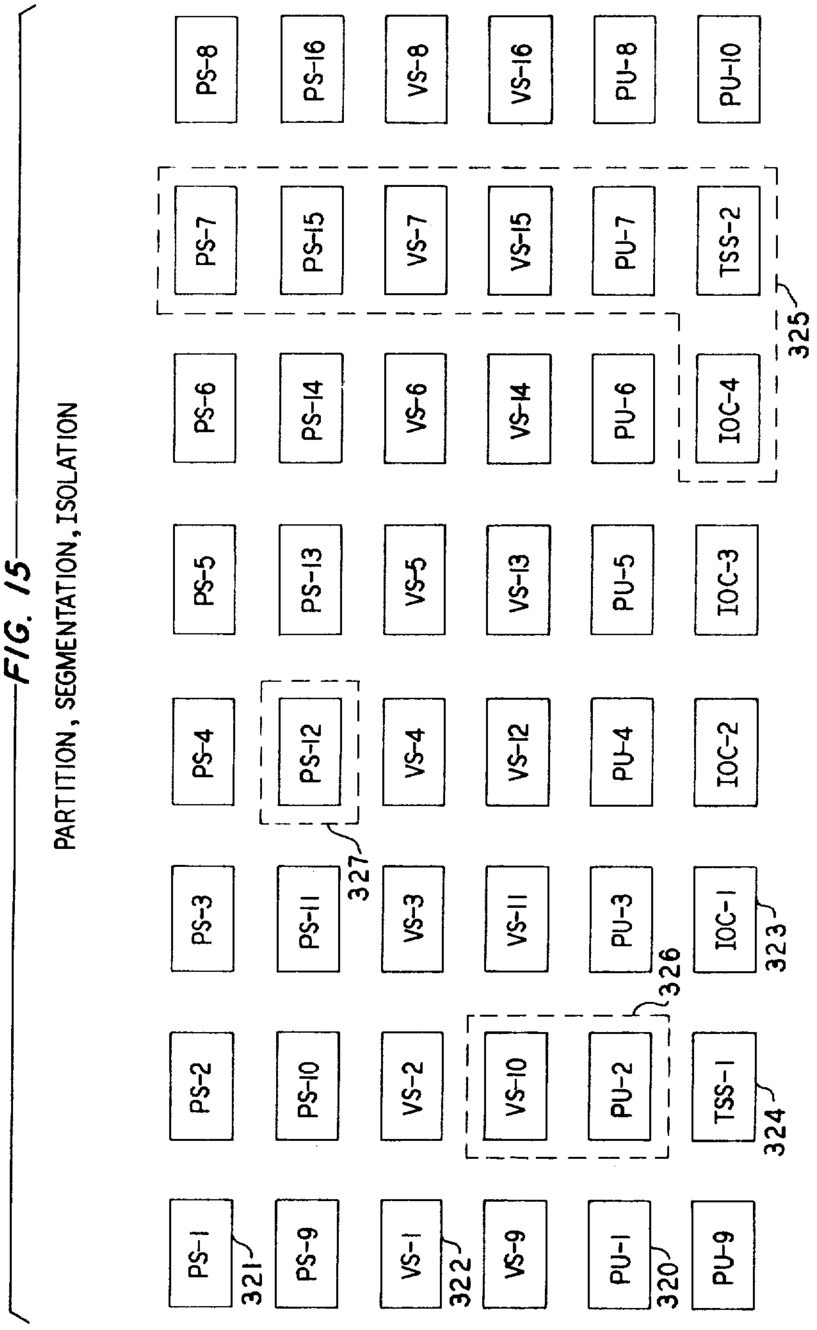
FIG. 15 is a graphical illustration of a multiprocessor computer showing the differences between partition, segmentation and isolation.

In FIG. 15 there is shown a graphical illustration of the partitioning segmentation, and isolation capabilities of the data processing system in accordance with the present invention. Each block in FIG. 15 represents one of the major modules illustrated in FIG. 2. There are included in the data processing system 10 processing units such as processing unit 320, 16 program store units such as program store unit 321, 16 variable store units such as variable store unit 322, four input-output controller units such as controller 323, and two timing and status units such as timing and status unit 324. The remainder of the units of the data processing system are peripheral subsystems to the central logic and control and may be viewed as an extension of the IOC or as part of the I/O subsystem.

A partition is defined as a combination of data processing modules including at least one processing unit, at least one program store unit, at least one variable store unit, at least one input-output controller, and at least one timing and status unit. Moreover, such a partition not only includes each of the basic types of units, but is also capable of independent operations as a stand-alone data processing system. One of the many possible partitions of the units illustrated in FIG. 15 is indicated by dashed block 325. In accordance with the above definition of partition, partition 325 is capable of accepting independent programs and independent data and processing that data in accordance with those programs with no reference whatsoever to the operations of the balance of the system. The balance of the system may, of course, be operating on a different program, using different data, all independently of partition 325.

A segment in the present context is defined as a plurality of basic units which is less than that required for independent data processing or which is not in fact being used for independent data processing. One such segment is illustrated by box 326 in FIG. 15. The purpose of segmentation might be, for example, to interact at least two of the units for diagnostic purposes, in initial setup, or for experimental purposes. Since a segment is not complete and cannot perform independent data processing operations, the interaction of the units of the segment must be controlled from an operator console.

Isolation in this context is defined as a separation of an individual unit from the balance of the system. The box 327 indicates one possible isolation of a program store unit. Isolation is normally necessary following the detection of a fault in the unit to be isolated. Once it is isolated, diagnostic tests may be performed on the unit to locate the fault. The fault may then be corrected and the isolated unit returned to service. Similarly, units may be maintained in an isolated condition as standby units for other units actively participating in data processing system. Since the modules of each of the module types are identical, such substitutions are possible.

Figure 16:
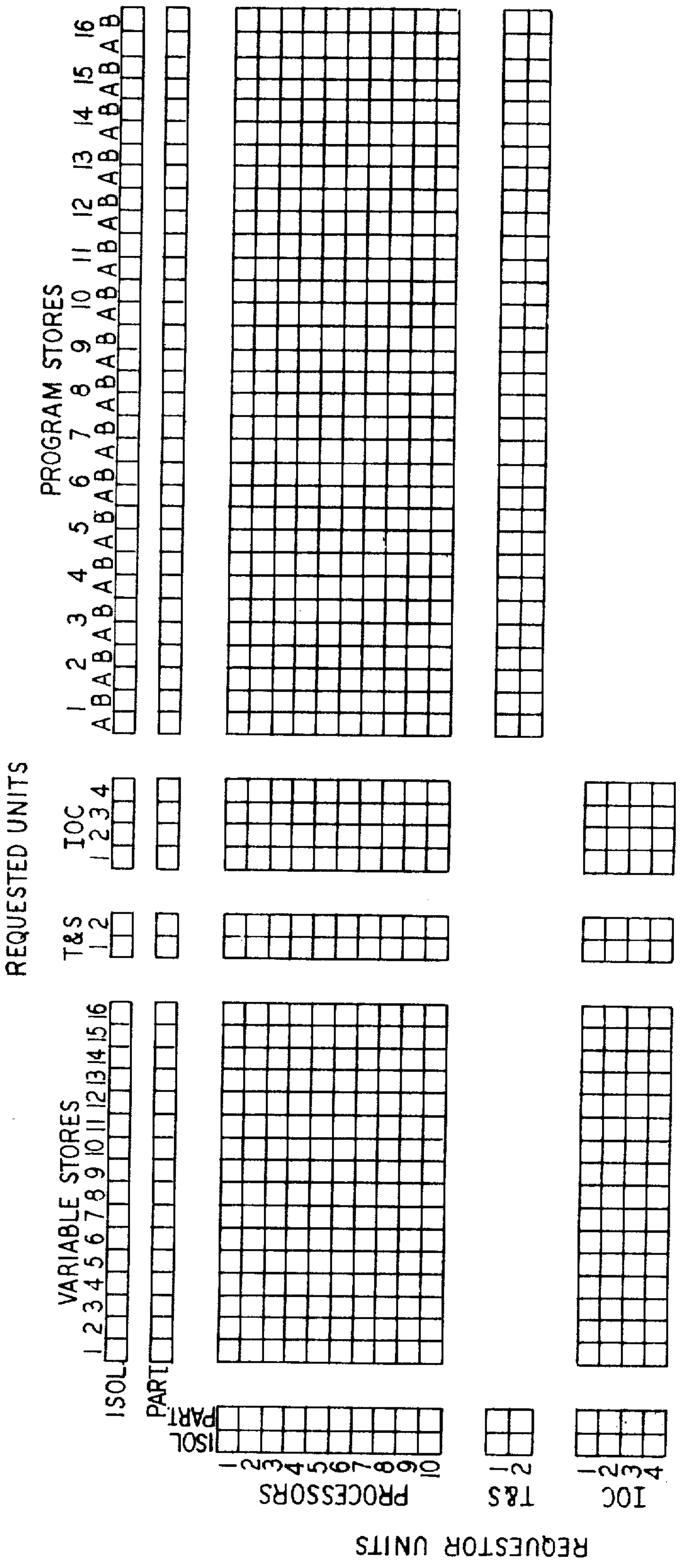
FIG. 16 is an illustration of a display board useful in indication of the configuration status of a multiprocessor computer such as that of FIG. 15.

In FIG. 16 there is shown one possible display configuration for displaying the status of the units of the data processing system shown in FIG. 15. For this purpose, these units are divided into two basic types: requestor units and requested units. The requestor units include the processors, the input-output controllers, and the timing and status units. They are called requestors since they are able to initiate requests for service to the others of the units. Similarly, the requested units include the program stores, the variable stores, the input-output controllers and the timing and status units. The display matrix shown in FIG. 16 is particularly suitable for displaying the status of these units in a graphical manner. The display position at each cross-point, corresponding to one of the requestor units and one of the requested units, can be used to indicate the status of interconnections between that requestor and that requested unit. If, for example, lamps are used at these display points, a single lighted lamp can be used to indicate the interruption of communication between the two units. Moreover, different color lamps can be used to represent the status of these units in terms of partitioning, segmentation and isolation. Thus, for example, those units involved in a particular partition can be identified by similarly colored lamps at the appropriate intersection point. As can be seen in FIG. 16, separate banks of display positions are provided to distinguish between isolation and partition for each of the units.

Since not all of the requestor units have access to all of the requested units, display lamps are not required at some of the cross-points.

The configuration display of FIG. 16 forms a part of the status control console connected to the status unit 240 in FIG. 11. Also included in this status control console are banks of manual switches which may be used to generate control signals to initiate the partitioning, segmentation and isolation signals. These manually generated signals, and software-generated signals from the flip-flop register 260 (FIG. 12), are used to control the generation of the lockout signals necessary to execute the isolation, segmentation and partitioning operations.

Figure 17:
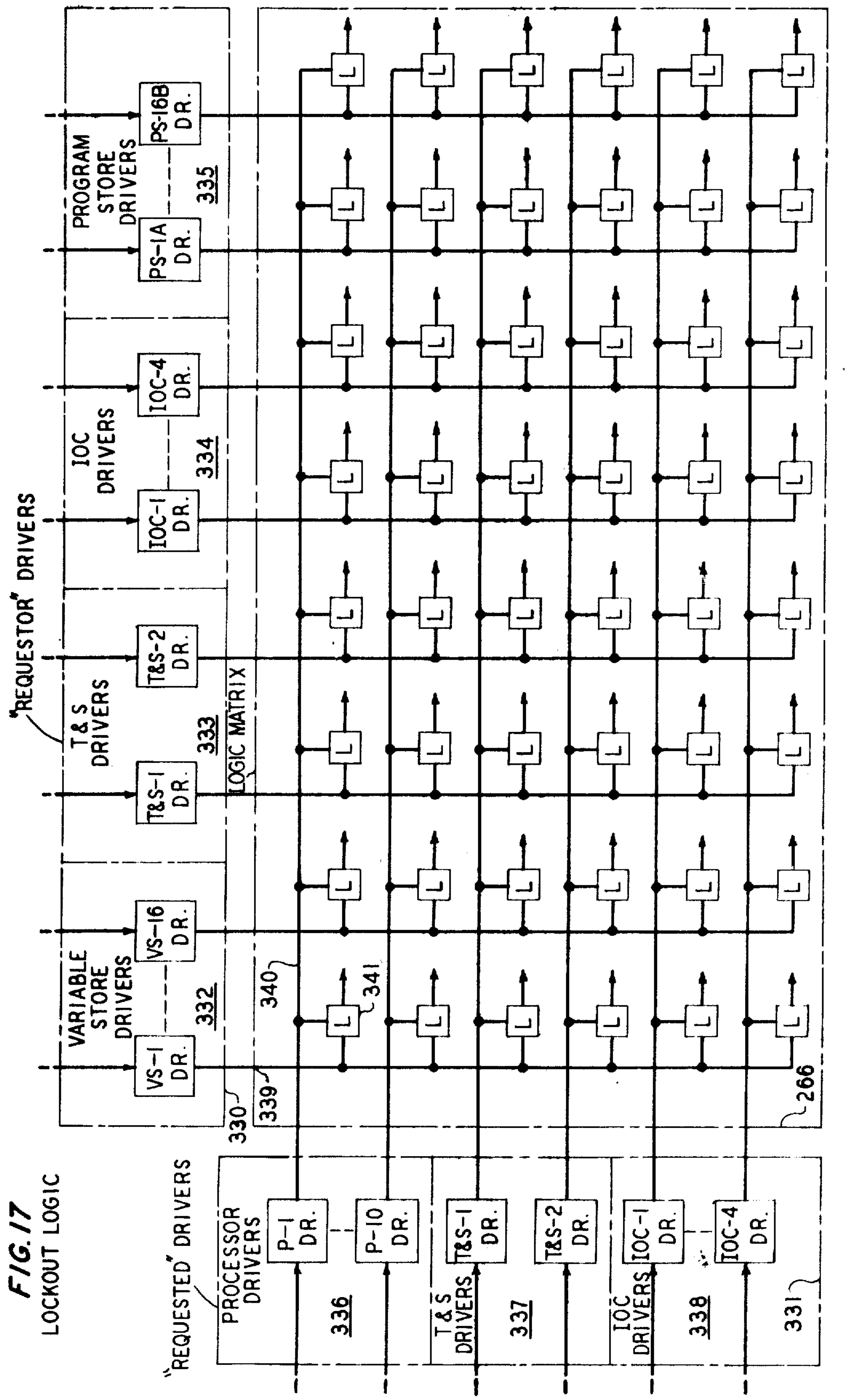
FIG. 17 is a general circuit diagram of the lockout logic portion of the status unit shown in FIG. 12.

In FIG. 17 there is shown a detailed block diagram of the lockout logic which forms a part of the status unit 240 (FIG. 11) and, more particularly, the matrix drive circuit 265 and matrix 260 of FIG. 12. In FIG. 17, the matrix drivers are divided into two types: requestor drivers 330 and requested drivers 331. Included among the requestor drivers are the variable store drivers 332, numbering 16 to correspond to the 16 variable store units of FIG. 15. Also included are two timing and status drivers 333, four input-output controller drivers 334, and thirty-two program store drivers 335. Similarly the requested drivers 331 include ten processing unit drivers 336, two timing and status drivers 337, and four input-output controller drivers 338. The output of each of these drivers comprises a matrix bus such as busses 339 and 340 which can be termed requestor busses and requested busses, respectively.

At the intersection or cross-point of each requestor bus with each requested bus is a logic circuit 341. All of the logic circuits 341 are identical and utilize the signals on the requestor bus and requested bus to generate control signals for lockout purposes. The details of these circuits will be taken up at a later time in this discussion.

Figure 18:
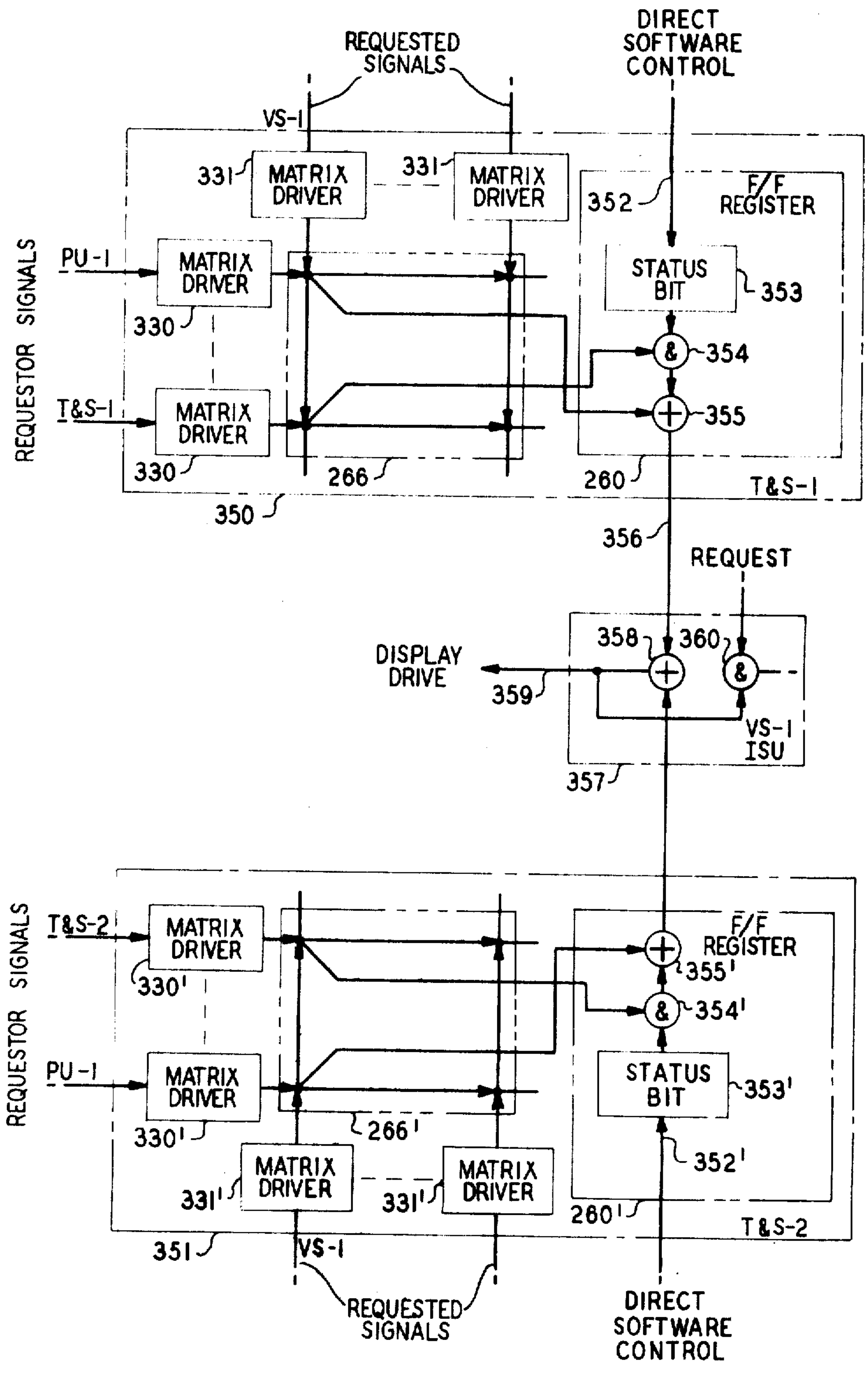
FIG. 18 is a circuit example of the operation of the lockout circuitry shown in general form in FIG. 17.

In order to better understand the lockout arrangement, a simplified example of lockout signal generation and utilization is shown in FIG. 18. It will first be recalled that two timing and status units are provided in the data processing system. In FIG. 18, these are illustrated as timing and status unit 350 and timing and status unit 351. These units are identical in all respects, but derive independent lockout signals. As can be seen in timing and status unit 350, the requestor signals are applied to matrix drivers 330 while the requested signals are applied to matrix drivers 331. The matrix 266 generates lockout signals which are applied to the flip-flop register 260 (also illustrated in FIG. 12). The lockout signal is applied by way of OR-gate 355 to the appropriate register position 260 and generates a lockout signal on lead 356. The lockout conditions are stored in the matrix drivers 330, 331 and can be read out and tested by the processing units. The status bit 353 can be set by software signals and, if not disabled by AND-gate 354, provide independent lockout signals on lead 356, a pair-by-pair basis. The lockout signal on lead 356 is applied to the interface switching unit of the unit to be locked out, in the present example, interface switching unit 357 of Variable Store Unit 1.

The signal on lead 356 is applied to OR-gate 358 where it is ORed with a similar signal from timing and status unit 351. The output of OR-gate 358, appearing on lead 359, is applied to a display such as the display illustrated in FIG. 16 and is also applied to AND-gate 360. AND-gate 360 inhibits the transfer of data from variable store unit 1 to processing unit number 1 by inhibiting requests for such transfers at this gate. In this fashion, the lockout becomes effective at the interface switching unit to inhibit transfer of signals between the two units.

It will be understood that the arrangement of FIG. 18 is merely illustrative of similar interconnections and logic which are provided to lock out communication between each two of the units shown in FIG. 15. A unit is isolated when it is locked out from all of the units of the system. A plurality of units are segregated or partitioned when they are locked out from communication with all of the other units of the system except those within their group. Each of these functions, i.e., isolation and partitioning, are controlled by the same type of lockout signals generated in a similar fashion and operative at the interface switching units to inhibit the data transfers.

Segmentation represents a degree of freedom which cannot always be handled by the matrix drive circuitry since a segment may also be viewed as a partition within a partition. Therefore a segment maybe set up by software directly into the status bit positions 353 via an interface 352 which bypasses the matrix drive circuitry. This feature is built in to the status unit and accessible via instructions from the processor unit.

Before proceeding to a more detailed description of the lockout arrangement in accordance with the present invention, it will be first noted that all of the circuits of the data processing system heretofore illustrated are made up of a few basic types of logic circuits. Each of these basic types will be illustrated in detail and descriptions provided of their specific operations.

Thus, in FIG. 19A, there is shown a detailed circuit diagram of a basic gate circuit 370 comprising a plurality of transistors 371 through 373, the bases of which are each connected to a corresponding one of input terminals 374 through 376, and all of the collectors connected to a single output terminal 377 of the gate circuit 370. The biases from source 378 on the transistors 371 through 373 are arranged such that the voltage on output terminal 377 remains at a high voltage level only if all of the transistors 371 through 373 remain in an OFF condition.

An input signal at any one of input terminals 374 through 376 turns on the corresponding one of transistors 371 through 373 and thus reduces the voltage at output terminal 377 to near zero volts. If the high voltage condition is taken as binary "1" and the zero volt condition taken as a binary "0," the circuit of FIG. 19A can be described by the truth table of FIG. 19D, where FIG. 19D is limited to two input signals. The gate of FIG. 19A can be described alternatively as a NOT AND gate, illustrated schematically in FIG. 19B, or a NOR gate, illustrated schematically in FIG. 19C. The Boolean expression for the outputs of these gates are shown in the figures. This particular configuration was chosen as a basic gate because of the versatility of this basic logic function. Moreover such basic gates are preferably fabricated in integrated circuit form and thus large numbers of said gates can be concentrated in very small physical areas.

In FIG. 20A there is shown a basic configuration of flip-flop circuit 380 comprising two transistors 381 and 382 cross-coupled in the basic multivibrator configuration and including input terminals 383 and 384 and having output terminals 385 and 386. Input terminal 383 may be termed the "set" input terminal while 384 may be considered the "clear" input terminal. Similarly, output terminal 385 may be considered the "0" output terminal and terminal 386 may be considered the "1" output terminal. The flip-flop symbol is illustrated in FIG. 20B. Such a flip-flop has the well-known properties of assuming either of two stable states until triggered to the other state by an input trigger signal.

Figure 21A:
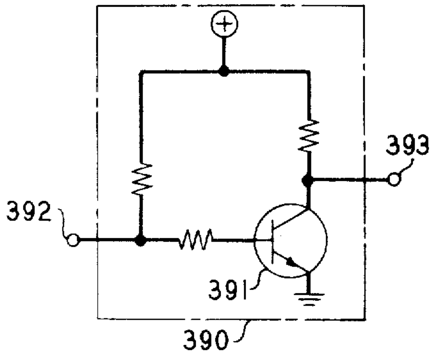
FIGS. 21A and 21B are a circuit diagram and symbols, respectively, of an inverter circuit useful in realizing the circuits of the remainder of the drawings.
Figure 21B:
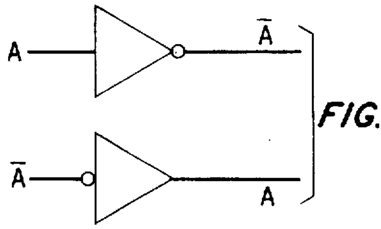

In FIG. 21A, there is shown an inverter circuit 390 comprising a transistor amplifier 391 having an input terminal 392 and an output terminal 393. Input terminal 392 is connected to the base of transistor 391 while output terminal 393 is connected to the collector of transistor 391. The inverter circuit 390 has the property of producing, on its output terminal 393, a binary signal which is inverse of the binary signal at its input terminal 392. In FIG. 21B there are shown two alternative symbols representing the inverter circuit of FIG. 21A.

Figure 22A:
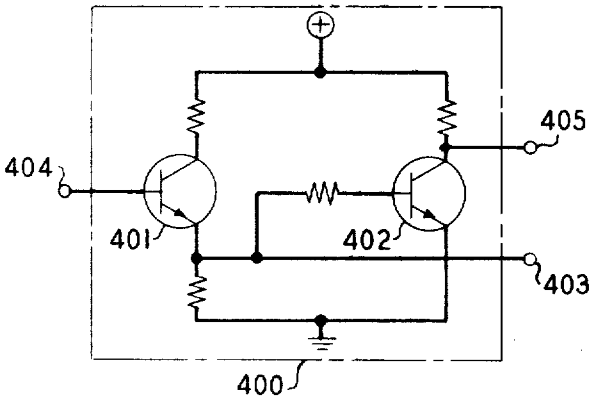
FIGS. 22A and 22B are a circuit diagram and symbol, respectively, of an emitter-follower circuit useful in realizing the circuits of the remainder of the drawings.
Figure 22B:
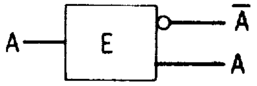

In FIG. 22A, there is shown an emitter follower circuit 400 including transistors 401 and 402. Transistor 401 is connected in a standard emitter follower configuration and provides on output terminal 403 a signal identical to the signal at input terminal 404. Transistor 402 is connected in the standard common emitter configuration and provides, on output terminal 405, a signal which is inverse of the signal at terminal 403. The symbol of the emitter follower of FIG. 22A is shown in FIG. 22B.

Figure 23A:
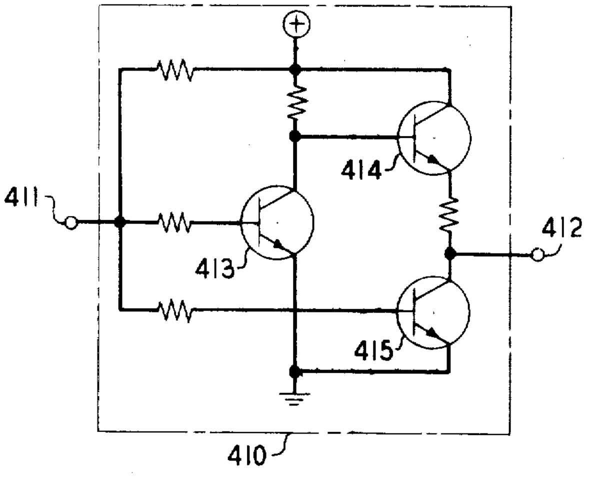
FIGS. 23A and 23B are a circuit diagram and symbol, respectively, of a cable driver circuit useful in realizing the circuits of the remainder of the drawings.
Figure 23B:
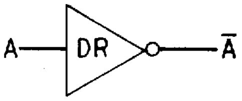

In FIG. 23A there is shown a circuit diagram of a cable driver 410 having an input terminal 411 and an output terminal 412. Included in driver circuit 410 are three transistors 413, 414 and 415. Together, these transistors form a two stage power amplifier which is used to drive binary signals through lengths of cable to the various components of the data processing system. The signal at output terminal 412, however, is the inverse of the signal at input terminal 411. A symbolic representation of the cable driver of FIG. 22A is shown in FIG. 23B.

In FIG. 24 there is shown a detailed logic diagram, using the logic circuits of FIGS. 19 through 23, of the partition portion of the requestor driver logic shown in block form in box 330 in FIG. 17. A flip-flop circuit 420 is provided to store the software-initiated requests for partition. Flip-flop 420 is under the control of NAND-gates 421 and 422. These software requests originate by way of instructions as detailed above, a particular partition request being represented by a pattern of data bits driving gates, similar to NAND-gates 421 and 422, in the overall requestor partition driver logic circuits.

Manual requests are initiated by switches on the status control console and arrive on lead 423 along with a manual mode enabling signal on lead 424. These signals are applied to emitter follower circuits 425 and 426, respectively, the outputs of which are applied to NAND-gate 427. The output of NAND-gate 427, together with the "0" output of flip-flop 420, is applied to NOR-gate 428, the output of which, in turn, is applied to cable driver 429.

It can be seen that a software request for partition, as registered in flip-flop 420, or a manual request, as indicated by the output of NAND-gate 427, initiates a signal on lead 430 indicating the request for partition. The "1" output of flip-flop 420 is applied to Pulsed Set Indicator circuit 431 to provide bilateral access to flip-flop 420 for the use of the maintenance and diagnostic subsystem. This maintenance and diagnostic subsystem forms a subject matter of the copending application of J. S. Baynard Jr. et al., Ser. No. 836,241, filed of even date herewith. It will not be discussed in detail here.

A driver logic circuit such as that shown in FIG. 24 is provided for each of the requestor units, that is there are 16 such logic circuits, one for each of the variable store modules, two circuits for the timing and status modules, four logic circuits for the input-output controllers, and 32 logic circuits, one for each of the 32 program store modules.

In FIG. 25 there is shown the partition driver logic for the requested units, shown as box 331 in FIG. 17. For the sake of simplicity, it has been assumed that only two separate partitions are necessary for the data processing system of the present invention. These have been identified as partition 1 and partition 2. In FIG. 25 the logic is provided to accommodate requests for inclusion in either one of these two partitions. A flip-flop circuit 440 is used to register a software request for assignment to partition 1. This software request appears as input signals to NAND-gates 441 and 442. Similarly, flip-flop circuit 443 is used to store a software request, by way of NAND-gates 444 and 445, for inclusion within partition 2.

Manual requests for inclusion within these partitions appear on a single lead 446 where a "1" signal indicates a request for inclusion in partition 1, and a "0" signal indicates a request for inclusion in partition 2. These signals are applied to emitter follower circuit 447 which has a normal output on lead 448 and an inverted output on lead 449. A manual mode enabling signal on lead 450 is applied to emitter follower circuit 451. Similarly, an automatic mode enabling signal on lead 452 is applied to emitter follower circuit 451.

The "0" outputs of flip-flops 440 and 443, together with the outputs of emitter followers 447, 451 and 453, are selectively applied to the bank of NAND-gates including NAND-gates 454, 455, 456, and 457. NAND-gates 454 and 455 produce signals indicating request for inclusion in partition 1. These signals are applied to NOR-gate 458 and thence to cable driver 459. Similarly, NAND-gates 456 and 457 generate signals indicating requests for inclusion in partition 2. These signals are applied to NOR-gate 460 and thence to cable driver 461. Thus, a signal on lead 462 indicates a request for inclusion within partition 1 while a signal on lead 463 indicates a request for inclusion in partition 2.

Pulsed set indicator circuits 464 and 465 are used to provide access to flip-flops 440 and 443 in a manner similar to circuit 431 in FIG. 24.

It will be noted that a logic circuit similar to that of FIG. 25 is required for each of the requested units shown as box 331 in FIG. 17. Thus, ten processor module driver logic circuits are required, two timing and status module driver logic circuits and four input-output controller driver logic circuits. Although the circuits of FIGS. 24 and 25 are indicated as enabling partitions, it will be understood that requests for partitions less than a complete operating system results in a segmentation rather than partitioning.

Also included in each of the requestor driver circuits and each of the requested driver circuits of FIG. 17 is an isolation request driver logic circuit such as that shown in FIG. 26. A flip-flop circuit 470 is used to store software requests for isolation, such requests being applied to NAND-gates 471 and 472. A manual request for isolation, arriving on lead 473, is applied to emitter follower circuit 474. Similarly, a signal indicating that the associated unit has lost its power is available on lead 475 and is applied to emitter follower circuit 476. Since the loss of power in a module demands that that module be isolated from the balance of the system, such a power-off signal is treated the same way as a request for isolation.

The "1" output of flip-flop 470, together with the outputs of emitter followers 474 and 476, are applied to NOR-gate 477, the output of which is applied to cable driver 478. A signal output on lead 479 therefore indicates that the corresponding module must be isolated from the balance of the system.

The pulsed set indicator circuit 480 is connected to the "0" output of flip-flop circuit 470 for purposes similar to that described with reference to FIGS. 24 and 25.

In FIG. 27 there is shown the logic required for each of the cross-points of FIG. 17. FIG. 27 therefore represents the matrix cross-point logic 341 of FIG. 17. It will be noted that one of such cross-point logic circuits is required for each requestor-requested pair. Input lead 479 carries a signal indicating a request by a requestor module for isolation. This signal is derived from a circuit similar to the circuit of FIG. 26. Similarly, lead 479' carries a signal indicating a request for isolation by a request module and is also derived from a circuit similar to that of FIG. 26.

A signal on lead 430 indicates a request for partition by a requestor unit and is derived from a circuit similar to that illustrated in FIG. 24. A signal on lead 462 indicates a request for inclusion in partition 1 from a requested module while a signal on lead 463 indicates a request for inclusion within partition 2 by a requested module. The signals on leads 462 and 463 are derived from circuits similar to that of FIG. 25.

The signal on lead 430 is supplied directly to NAND-gate 490, and by way of inverter circuit 491 to NAND-gate 492. The outputs of NAND-gates 490 and 492, together with the signals on leads 479 and 479', are applied to NOR-gate 493, the output of which is applied to the cable drivers 494 and 495 in series. The output signal on lead 496 is a lockout signal which can be applied to the interface switching unit of each requested module and used to inhibit the access of a specific requested module to that requestor module. The specific use of one of these lockout signals was described with respect to the interface switching unit of FIG. 9.

It can be seen that the lockout signals generated by the circuits similar to FIG. 27 provide a means for inhibiting communication between each requestor-requested pair of modules of the data processing system. The inhibition of communications effectively separates such pairs of modules since no communication is permitted therebetween. When so separated, these modules can participate in separate and independent data processing operations, under the control of different programs, utilizing different processing units and variable storage units, as well as different timing and status units and different input-output controllers. In essence, the different partitions become different data processing systems and may be utilized as such so long as the partition continues. This is particularly useful in large data processing systems which occasionally have very heavy loads of real-time computation, but at other times have lighter real-time loads and it is desirable to utilize the excess data processing capacity for other purposes. As an example, during off-peak hours in the real time data processing load, a portion of the system can be partitioned away from the real-time computation load and utilized for nonreal-time data processing, such as assembly, compilation, and various maintenance and diagnostic procedures.

What is claimed is:

1. A data processing system comprising,
 a plurality of processing units,
 a plurality of storage units,
 a plurality of input-output units,
 switching means associated with each of said units for controlling interconnection between the associated unit and the remaining ones of said units,
 means associated with each of said switching means for determining the priority of requests for interconnection,
 means associated with each of said priority determining means for servicing said requests by first servicing that request having the highest priority, and
 inhibiting means for preventing the servicing of requests from selected ones of said units.

2. The data processing system according to claim 1 wherein said units are divided into two categories,
 one of said categories requesting service from other units and the other of said categories servicing such requests,
 said inhibiting means including
  means responsive to inhibiting signals corresponding to either member of each of said selected pair for preventing the servicing of requests from that unit of said pair in the requesting category to the other unit of said pair in the servicing category.

3. The data processing system according to claim 1 further including
 display means for indicating the inhibition of communication between each said pair.

4. The data processing system according to claim 1 wherein said inhibiting means includes
 means responsive to signals requesting the isolation of any of said units from the balance of said units.

5. The data processing system according to claim 1 wherein said inhibiting means includes means responsive to request for partitioning said data processing system into a plurality of separate and independent operating systems.

5. Data processing apparatus of the module type comprising,
 a plurality of identical processing modules,
 a plurality of identical storage modules, a plurality of identical input-output modules,
 means alternatively responsive to manually generated signals or to program-generated signals for partitioning said data processing apparatus into a plurality of separate and independent operating systems.

7. The data processing apparatus according to claim 6 further including interface switching means interconnecting said modules,
 said interface switching means including inhibiting means responsive to said signals.

8. The data processing apparatus according to claim 6 wherein
 said partitioning means includes a lockout matrix having a plurality of vertical driver circuits and a plurality of horizontal driver circuits,
 said signal being applied to said driver circuits,
 said driver circuits being responsive to said signals for generating control signals on a plurality of busses corresponding to said driver circuits and,
 logic circuit means at each cross-point of said busses for generating lockout signals in response to the coincident of control signals on any two of said busses.

9. The data processing apparatus according to claim 6 further including configuration display means for separately identifying those modules belonging to each of said separate and independent operating systems.

10. The data processing apparatus according to claim 6 further including register means for storing a representation of the current partition assignments of each said module.

11. An improved data processing system of a type having a plurality of processors, a plurality of memories, a plurality of timing generators, and a plurality of input-output controllers wherein the improvement comprises:
 a plurality of interconnection means;
 means for connecting each processor, memory, timing generator, and input-output controller to a different one of said plurality of interconnection means;
 means for connecting each of said interconnection means to a selected plurality of other interconnection means; and
 means for selectively enabling said connecting means between said interconnection means.

12. A selectively reconfigurable data processing system comprising, as basic components, pluralities of processors, memories, timing generators, and input-output controllers, and further comprising:
 a plurality of signal switching means each of which is directly connected to a different one of said basic components;
 means for interconnecting the signal switching means of selected ones of said basic components; and
 means within each signal switching means for inhibiting the reception of electrical signals transmitted by selected ones of said interconnections, thereby severing communication between the corresponding basic components.

13. In combination
 a plurality of data processing units,
 a plurality of memory units and
 a plurality of access control units,
 interunit switching means for interconnecting all of said units into a single multiunit data processing system,
 said switching means including lockout facilities, and control means utilizing said lockout facilities for partitioning said units into at least two independent data processing subsystems,
 each said subsystem including at least one of said processing units, one of said memory units and one of said access control units.

* * * * *

Disclaimer 3,641,505.—*Walter M. Artz*, Succasunna, *Kenneth R. Cornelius*, Parsippany, *John W. Olson*, Morris Township, Morris County, N.J.; *Gary R. Signor*, Burlington, N.C., and *Francis E. Slojkowski*, Millburn, N.J. MULTIPROCESSOR COMPUTER ADAPTED FOR PARTITIONING INTO A PLURALITY OF INDEPENDENTLY OPERATING SYSTEMS. Patent dated Feb. 8, 1972. Disclaimer filed May 15, 1972, by the assignees, *Bell Telephone Laboratories, Incorporated* and *Western Electric Company, Incorporated.*

Hereby enters this disclaimer to claims 1 through 7 and 9 through 13 of said patent.

[*Official Gazette February 19, 1974.*]